(12) United States Patent
Hsu et al.

(10) Patent No.: US 8,429,388 B2
(45) Date of Patent: *Apr. 23, 2013

(54) SYSTEM AND METHOD FOR EXPRESS EXECUTION OF INTERNET SERVICE ACCESSING

(75) Inventors: Sheng-Kai Hsu, Luodong Township (TW); Hsien-Wen Chang, Taipei (TW)

(73) Assignee: Getac Technology Corporation, Hsinchu (TW)

( * ) Notice: Subject to any disclaimer, the term of this patent is extended or adjusted under 35 U.S.C. 154(b) by 462 days.

This patent is subject to a terminal disclaimer.

(21) Appl. No.: 12/814,407

(22) Filed: Jun. 11, 2010

(65) Prior Publication Data
US 2010/0275003 A1 Oct. 28, 2010

Related U.S. Application Data

(63) Continuation-in-part of application No. 11/230,657, filed on Sep. 21, 2005, now Pat. No. 7,774,586.

(30) Foreign Application Priority Data

Jul. 22, 2005 (TW) .............................. 94125020 A

(51) Int. Cl.
*G06F 9/24* (2006.01)
*G06F 15/177* (2006.01)
(52) U.S. Cl.
USPC ................. 713/1; 713/2; 713/100; 715/700; 715/739; 715/961

(58) Field of Classification Search ................ 713/1, 2, 713/100; 715/700, 739, 961
See application file for complete search history.

(56) References Cited

U.S. PATENT DOCUMENTS 7,774,586 B2 * 8/2010 Hsu .................................. 713/1
2004/0153600 A1 * 8/2004 Rydman ....................... 711/102

OTHER PUBLICATIONS http://event.asus.com/mb/expressgate/, printed on Jun. 13, 2010.
http://www.hyperspace.com/, printed on Jun. 11, 2010.
http://event.msi.com/mb/winki/, printed on Jun. 13, 2010.
http://www.asifism.com/installing-hp-quickplay-on-your-laptopnotebook-vista-xp/, printed on Jun. 11, 2010.
http://www.dell.com/downloads/global/products/latit/en/laptop-latitude-on-specsheet.pdf, printed on Jun. 11, 2010.

* cited by examiner

*Primary Examiner* — Kim Huynh
*Assistant Examiner* — Michael J Brown

(57) ABSTRACT

A method for express execution of internet service accessing with a touch-control interface for a computer system is provided. A computer system is installed with a first operating system in a data storage therein. The method includes the following steps: the computer system executing the BIOS of the computer system; before loading and executing the first operating system, the computer system detecting and activating a touch-control display device; the touch-control display device displaying executive item icons representing internet service accessing programs; detecting the executive item icon selection by the user; based on the selection, loading and executing the first operating system; and executing the internet service accessing program corresponding to the selected executive item icon.

22 Claims, 23 Drawing Sheets

SYSTEM AND METHOD FOR EXPRESS EXECUTION OF INTERNET SERVICE ACCESSING

CROSS-REFERENCES TO RELATED APPLICATIONS

The present application is a continuation-in-part application of U.S. patent application Ser. No. 11/230,657, filed on Sep. 21, 2005, which is hereby incorporated by reference.

FIELD OF THE INVENTION

The present invention relates to a method for internet service accessing and, more particularly, to a method for express execution of internet service accessing with a touch-control interface.

BACKGROUND OF THE INVENTION

The multimedia playing system made with the integration of a computer system and an audiovisual player is gaining popularity and is widely used on many occasions, including offices and households, because the rapid development of computer technology.

The design of the conventional multimedia playing systems is basically interfacing a computer system with an audiovisual player. With this type of design, the user usually needs to boot the computer system up in order to activate and operate the audiovisual player. In other words, the user must wait until the computer system completes the BIOS program initialization, POST program, peripheral detection and driving, OS activation, system state setting, and so on, before the user can execute the audiovisual program to play the audiovisual data. It is inconvenient for the user as there is no shortcut to bypass the tedious booting process of the computer system. Similar problems also occur in a mobile internet device (MID).

To overcome the aforementioned drawback, the current technology utilizes different designs to implement express execution of multimedia playing. These designs configure a different region in the hard-disk and install a first operating system, such as Linux-based OS, and a second operation system, such as a Windows OS, in different hard-disk regions. These designs require modification to the computer BIOS. The user can select the execution of PC mode or the AV mode by depressing its power button or specific hotkey respectively. When the user selects the AV mode, the computer system does not execute the usual booting process when the computer is turned on. Instead, the computer system loads and executes a first operating system in the first hard-disk region, and drives the audiovisual player. That is, the user does not enter the Windows OS; therefore, the time waiting for the system to finish the initialization of the hardware is saved.

However, the current implementations still requires the user to memorize the operation instruction and follow strictly in order to select between the PC mode and the AV mode (or internet mode of a MID). This lack of ease of use is still in convenient for the user.

Although some designs display operation instructions on the monitor to guide the user, this display of instruction usually takes place after the computer system enters the operating system mode; therefore, it does not meet the demands of express execution of playing multimedia data.

Furthermore, as most designs require the user to enter their selections through keyboard or mouse, which are only activated after the computer system enters the operating system mode, it is still inconvenient for the user.

SUMMARY OF THE INVENTION

The present invention is provided to overcome the aforementioned drawbacks of the conventional methods of express execution of internet service accessing.

An objective of the present invention is to provide a method for express execution of internet service accessing with a touch-control interface for a computer system.

According to the method for express execution of internet service accessing with a touch-control interface, the first step is to turn on the computer system. The computer system utilizing the method of the present invention includes at least one data storage, a system memory, a BIOS, a touch-control display device, and a network interface; and the data storage stores a first operating system, a touch-control display device driver for activating the touch-control display device, a network interface driver for activating the network interface, and at least one internet service accessing program.

After turning on the computer system, the computer system executes the BIOS of the computer system. Then, before loading and executing the first operating system, the computer detects the touch-control display device and the network interface, loads and executes the touch-control display driver to activate the touch-control display device, and displays an executive item icon representing the internet service accessing program with the touch-control display device. The executive item icon represents the internet service accessing program is for the computer system executing a procedure for loading and executing the first operating system, establishing internet connection through the network interface, and loading and executing the internet service accessing program. The computer system detects whether a selection is made by touching the executive item icon displayed on the touch-control display device, and then the computer system executes the procedure corresponding to the executive item icon when the executive item icon representing the internet service accessing program is touched on the touch-control display device.

By the method of the invention, a user can quickly determine to lunch a required internet service accessing program after the computer system completes the basic booting process. The regular computer booting process including loading and executing the operating system will not be lunched unless the user select a required internet service accessing program. Therefore, the user does not need to waiting for the lunching of the regular computer booting process before select the required internet service accessing program.

Another objective of the present invention is to provide a method for express execution of internet service accessing for a computer system.

According to the present invention, the first step is to turn on the computer system. The computer system utilizing the method computer system at least includes at least one data storage, a system memory, a BIOS, a touch-control display device, and a network interface. The data storage stores a first operating system, and a second operating system, a network interface driver for activating the network interface, and a touch-control display device driver for activating the touch-control display device.

After the computer system is turned on, the computer system executes the BIOS of the computer system. Then, before loading and executing the first operating system or the second operating system, the computer system displays a plurality of executive item icons representing a regular computer booting process and at least one internet service accessing program with the touch-control display device. The executive item icon representing the regular computer booting process is for executing a procedure for loading and executing the second operating system; and the executive item icon representing the internet service accessing program is for executing a procedure for loading and executing the first operating system, establishing internet connection through the network, and loading and executing the internet service accessing program. Then, the computer system determines which among the displayed executive item icons is selected, and then executes the procedure corresponding to the selected executive item icon.

By the method of the invention, a user can determine to lunch an internet service accessing program in a simplified operating system quickly, or to lunch a regular operating system.

Yet another objective of the present invention is to provide a computer system for express execution of internet service accessing.

The computer system includes a control circuit, a BIOS memory, a system memory, a touch-control display device, a network interface, and at least one data storage.

The BIOS memory is connected to the control circuit, and stores a BIOS program. And the system memory is also connected t the control circuit to provide a random access memory region for the space required for executing programs.

The touch-control display device is connected to the control circuit, for sending an input signal to the control circuit and receiving visual signals generated by the control circuit for displaying.

The network interface is connected to the control circuit for establishing internet connection.

The data storage stores a first operating system, a touch-control display device driver for activating the touch-control display device, a network interface driver for activating the network interface, and at least one internet service accessing program.

After the computer is turned on, the control circuit executes the BIOS program to detect the touch-control display device and the network interface, and loads and executes the touch-control display driver to activate the touch-control display device. The touch-control display device displays at least one executive item icon representing at least one internet service accessing program; and then the control circuit determines which among the displayed executive item icons is selected according to the input signal sent by the touch-control signal receiver before loading and executing the first operating system.

After any of the displayed executive item icons is selected, the control circuit loads and executes the first operating system, establishes internet connection through the network interface, and loads and executes the internet service accessing program corresponding to the selected executive item icon.

By the computer system of the invention, a user can quickly determine to lunch a required internet service accessing program after the computer system completes the basic booting process. The regular computer booting process including loading and executing the operating system will not be lunched unless the user select a required internet service accessing program. Therefore, the user does not need to waiting for the lunching of the regular computer booting process before select the required internet service accessing program.

In comparison with the conventional methods and computer systems, the present invention allows the user to select the executive item icon to execute the corresponding internet service accessing program without performing complicate operation. Therefore, the present invention provides a user-friendly interface for convenient use of the computer system. In addition, the computer system of the present invention activates touch-control display device after the BIOS and POST process, and waits for the user to enter their selection. Therefore, the user can directly execute the internet service accessing program without waiting for entering the regular operating system environment of a computer system.

These and other objective, features, and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
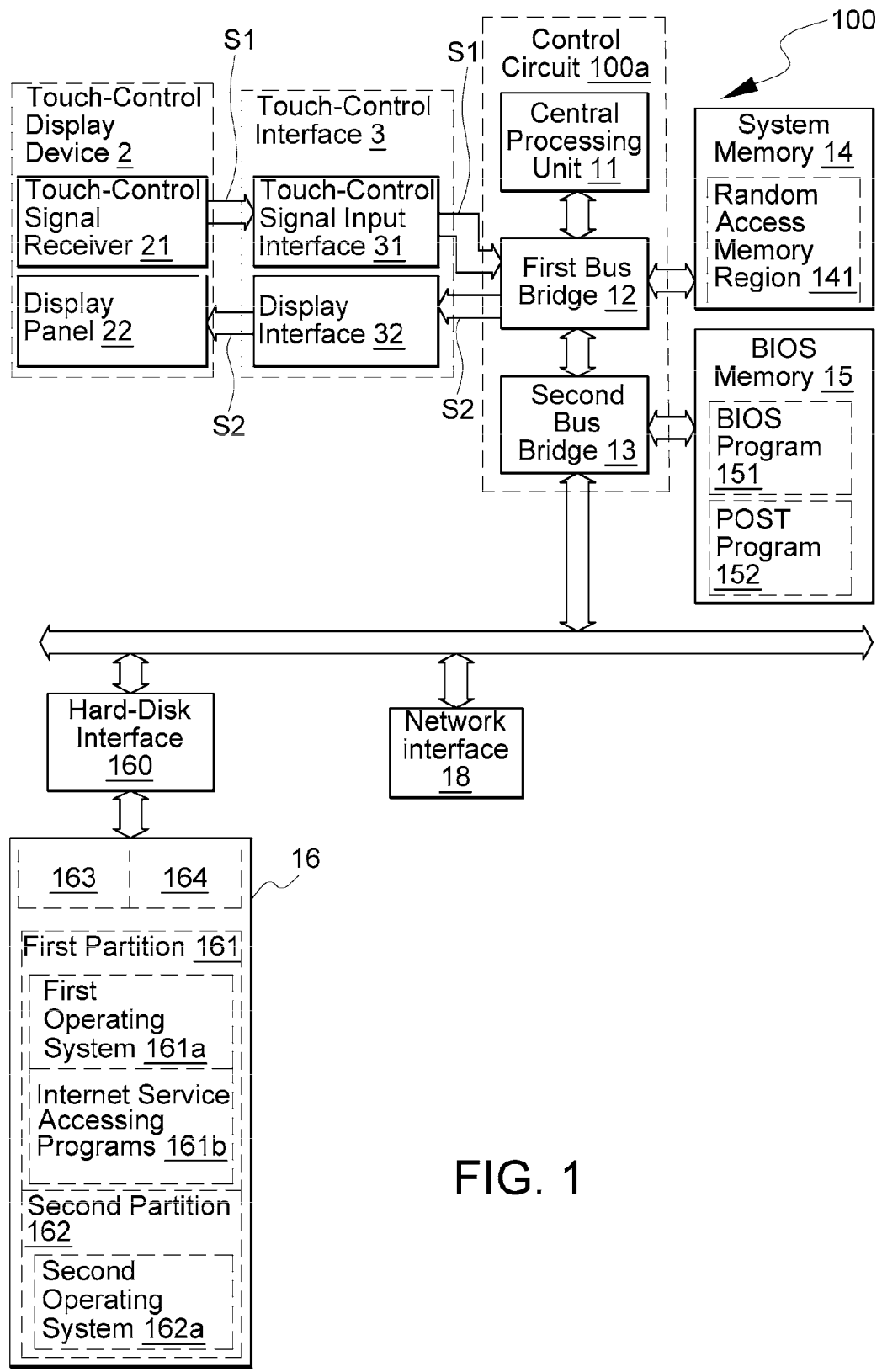
FIG. 1 shows a functional block diagram according to a first embodiment of the present invention.

With reference to the drawings and in particular to FIG. 1, which shows a functional block diagram according to a first embodiment of the present invention, a computer system 100 for express execution of internet service accessing comprises a control circuit 100a disposed therein.

The control circuit 100a includes a central processing unit 11, a first bus bridge 12, and a second bus bridge 13. The central processing unit 11 is connected to the first bus bridge 12 through a system bus. The first bus bridge 12 is connected to a system memory 14. The computer system 100 further comprises a network interface 18, connected to the first bus bridge 12 or the second bus bridge 13 through the system bus.

A BIOS memory 15 is connected to the second bus bridge 13 of the control circuit 100*a*. The BIOS memory 15 stores a BIOS program 151 and a power-on-self-test (POST) program 152, to form a BIOS (Basic-Input-Output-System) required by the computer system 100 during the booting.

The second bus bridge 13 is connected to a hard-disk interface 160 through a bus. The hard-disk interface 160 is connected to a hard-disk 16. The hard-disk 16 served as a data storage is for storing data, such as a first operating system 161*a*, a second operating system 162*a*, a network interface driver 163, a touch-control display device driver 164, and various internet service accessing programs 161*b* in the present invention. The data storage described above is not limited to the hard-disk 16.

The hard-disk 16 can be altered by a solid-state-disk drive, a flash memory module, or the other types of mass storage device. Since the data storage is not limited to the hard-disk 16, the data storage is not necessarily connected to the second bus bridge 13 through the hard-disk interface 160. For example, if the hard-disk 16 served as the data storage is replaced by a flash memory module; the flash memory module is connected to the second bus bridge 13 through the other type of interface.

The hard-disk 16 is configured to comprise a first partition 161 and a second partition 162. The first partition 161 is installed with a first operating system 161*a*, such as a Linux-based operating system, a Tiny Windows-based operating system, or an embedded operating system. The first partition 161 also stores the internet service accessing programs 161*b* and other application programs working under the first operating system 161*a* environment. The second partition 162 is installed with a second operating system 162*a*, such as Windows-operating system and other application programs working under the second operating system 162*a* environment.

In the above described embodiment, the first partition 161 and the second partition 162 are configured in one single hard-disk 16 for installing the first operating system 161*a* and the second operating system 162*a* respectively, and the drivers or application programs are stored in the same partition in which the required operating system is installed therein. However, the embodiment of the present invention is not restricted to one single hard disk 16 or data storage; two or more data storages can be utilized.

For example, when a first data storage and a second data storage are provided, the first partition 161 and the second partition 162 can be configured in different data storages respectively. And the first operating system 161*a* and the second operating system 162*a* are respectively installed to different data storages. Furthermore, the network interface driver 163, internet service accessing programs 161*b* or application programs are not necessarily stored in the same data storage that the required operating system is installed therein. That is, the data storage storing the first operating system 161*a* can be different from the data storage storing the touch-control display device driver 164, the network interface driver 163, and the internet service accessing program 161*b*; or one or more of the drivers including the touch-control display device driver 164, the network interface driver 163, and the internet service accessing program 161*b* are stored in the data storage which also stores the first operating system 161*a*, and the others are stored different from the data storage storing the first operating system 161*a*. Or a third data storage different from the first or the second data storage can be utilized to store the drivers or application programs.

The network interface 18 is connected to the second bus bridge 13 of the control circuit 100*a*, and is provided for connecting to a communication network, so as to establish network connection. The hard-disk 16 of the computer system 100 stores the network interface driver 163 for activating the network interface 18. The network interface driver 163 can also be built-in insides the BIOS memory 15. The network interface 18 can be a wired network interface, connected to the internet through a network cable; or the network interface 18 can be a wireless network interface, connected to the internet through a Wi-Fi hotspot in a wireless local area network (WLAN). The wireless communication described above is not limited to the WLAN, it can be a Mobile packet data service of a mobile phone service network for bridging the network interface 18 to the internet (or the intranet).

The computer system 100 of the first embodiment also comprises a touch-control display device 2, connected to the computer system 100 through a touch-control interface 3, to serve as a combination of a touch-control signal receiver 21 and a display device 22. The hard-disk 16 of the computer system 100 stores the touch-control display driver 164 for activating the touch-control display device 2. The touch-control display driver 164 can also be built-in inside the BIOS memory 15. The touch-control display device 2 can receive instructions input, send an input signal S1 to the control circuit 100*a*, and receives visual signals generated by the control circuit 100*a* to display information of the computer system 100.

In the preferred embodiment of the present invention, the touch-control interface 3 is a high speed display bus interface, such as known AGP display bus interface, connected to the first bus bridge 12 or a PCI bus interface connected to the second bus bridge 13.

The touch-control display device 2 comprises the touch-control signal receiver 21 and a display panel 22. The touch-control signal receiver 21 is disposed on the display panel 22 to form the touch-control display device 2. The touch-control signal receiver 21 and the display panel 22 are connected to the first bus bridge 12 of the control circuit 100*a* of the computer system 100 through a touch-control signal input interface 31 and a display interface 32, respectively. When the touch-control signal receiver 21 is touched, the touch-control signal receiver 21 sends an input signal S1 to the control circuit 100*a* of the computer system 100. Similarly, a visual signal S2 generated by the control circuit 100*a* of the computer system 100 is received by and displayed on the display panel 22 of the touch-control display device 2.

Figure 2:
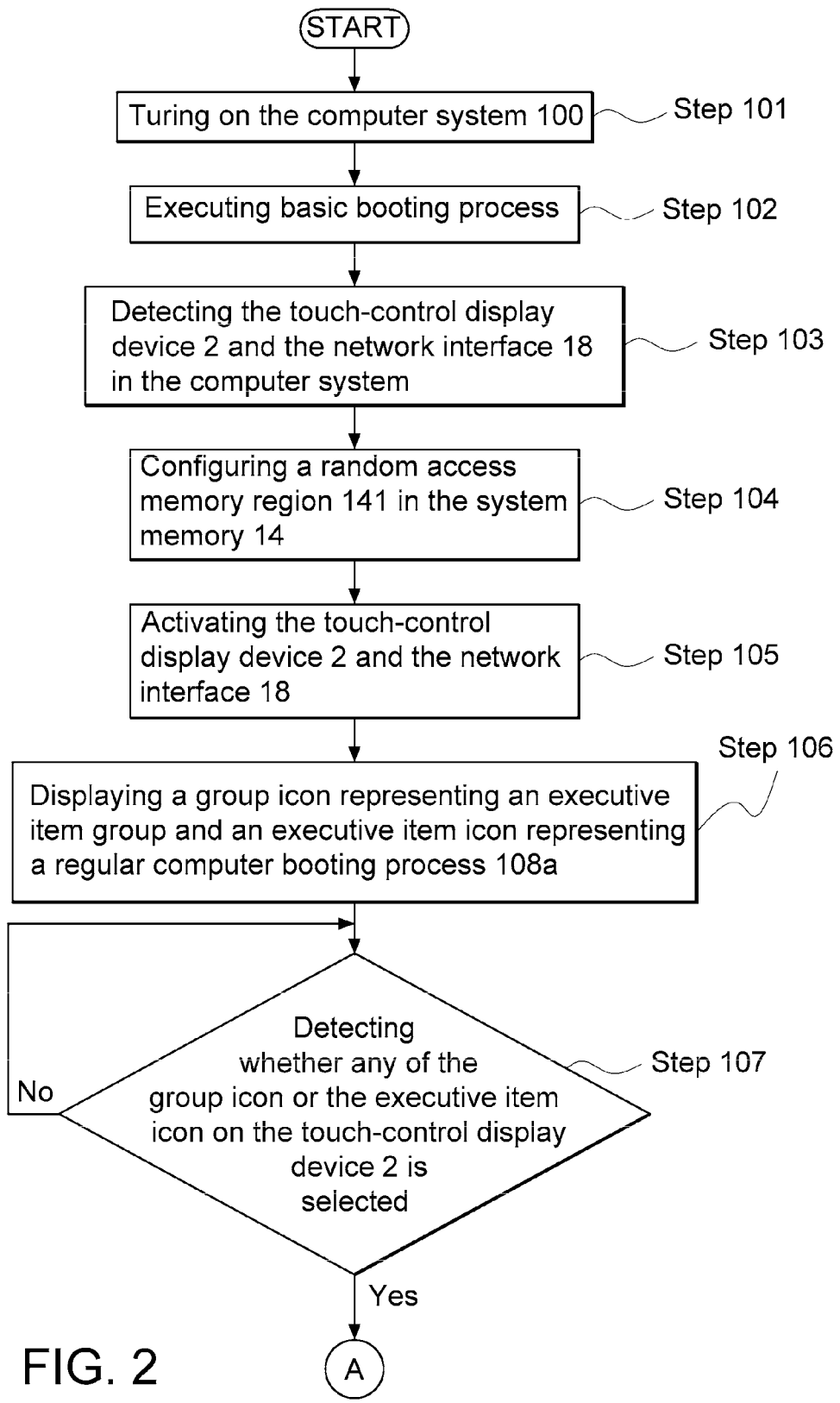
FIG. 2, FIG. 3, FIG. 4 show a flowchart according to the first embodiment of the present invention.
Figure 3:
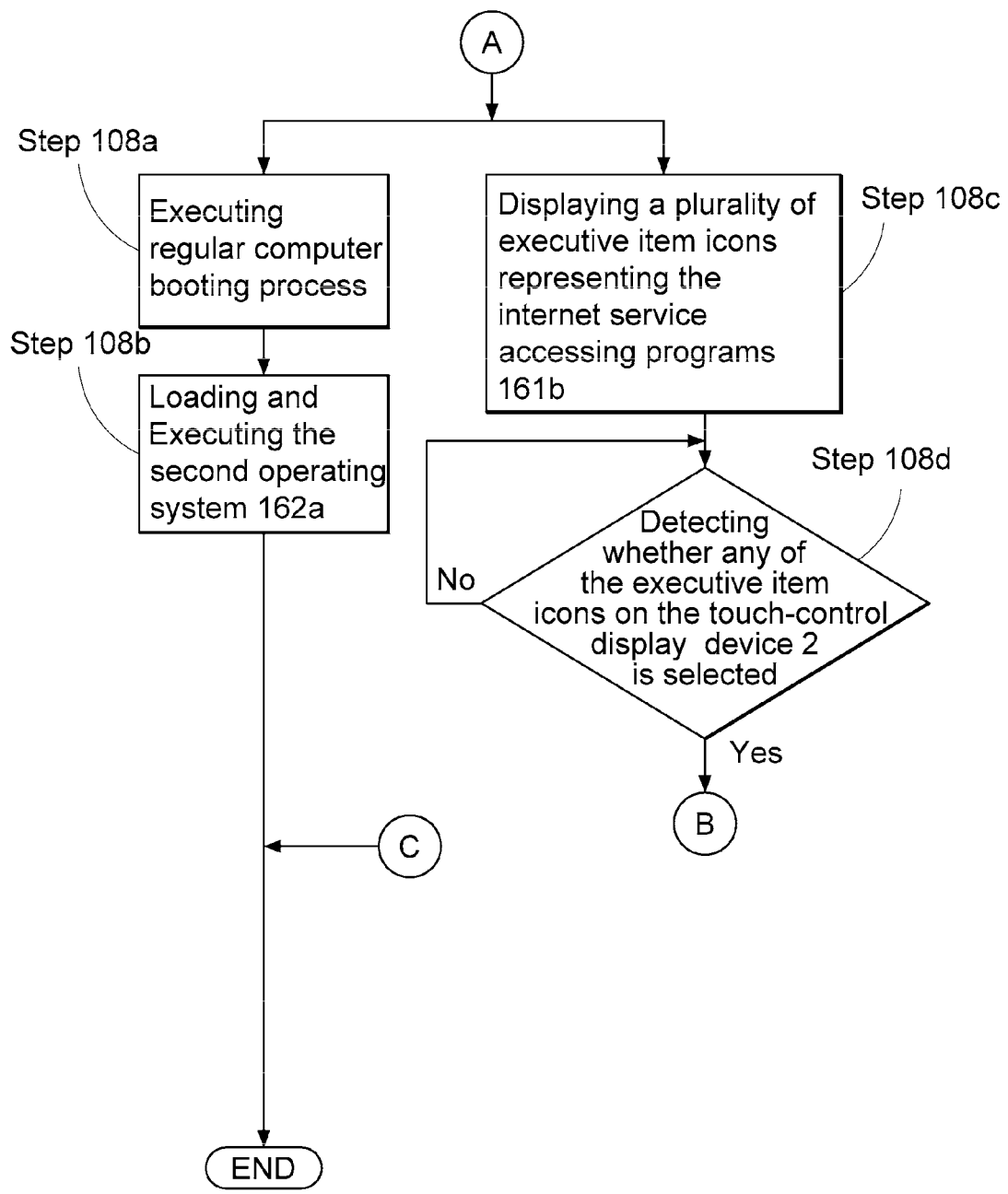
Figure 4:
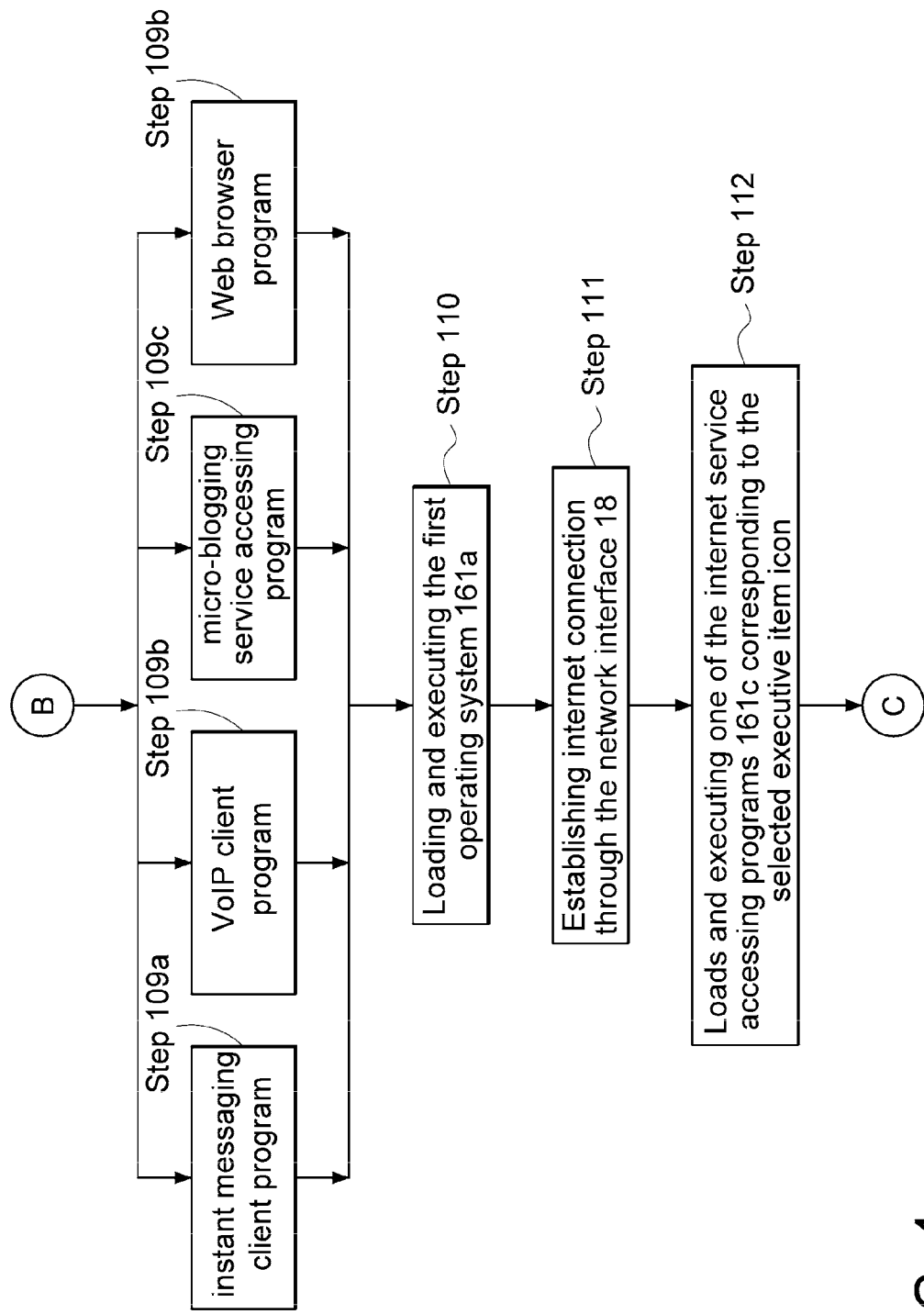

FIG. 2, FIG. 3, and FIG. 4 show the flowchart of the present invention. The following description refers to FIGS. 1, 2, and 3.

Step 101 is to turn on the computer system 100.

In the Step 102, the computer system 100 executes basic booting process. That is, the computer system 100 executes the BIOS; that is the computer system 100 loads and executes the BIOS program 151 and the POST program 152 from the BIOS memory 15.

Before loading and executing the first operating system 161*a* or the second operating system 162*a*, the computer system 100 executing the BIOS program 151 performs the following steps.

Step 103 is for the computer system 100 executing the BIOS program 151 to detect the touch-control display device 2 and the network interface 18 in the computer system 100. As aforementioned description, the network interface 18 can be a wired network interface or a wireless network interface.

Step 104 is to configure a random access memory region 141 in the system memory 14 of the computer system 100 for the space required for executing the first or the second operating system 161a, 162a, the network interface driver 163, the touch-control display driver 164, and the internet service accessing program 161b.

Step 105 is for the computer system 100 executing the BIOS program 151 to load and execute the touch-control display driver 164 from the hard-disk 16 to activate the touch-control display device 2, so that the touch-control display device 2 can start to operate. In Step 105, the computer system 100 executing the BIOS program 151 also loads and executes the network interface driver, so as to activate the network interface 18.

Step 106 is for the display panel 22 of the touch-control display device 2 to display a group icon 2a representing an executive item group and an executive item icon 2b representing a regular computer booting process.

Step 107 is for the computer system 100 detecting whether any of the group icon 2a or the executive item icon 2b on the touch-control display device 2 is selected, i.e., touched on the touch-control display device 2. When a selection is detected, the computer system 100 determines which among the group icon 2a and the executive item icon 2b representing a regular computer booting process is selected.

Figure 5:
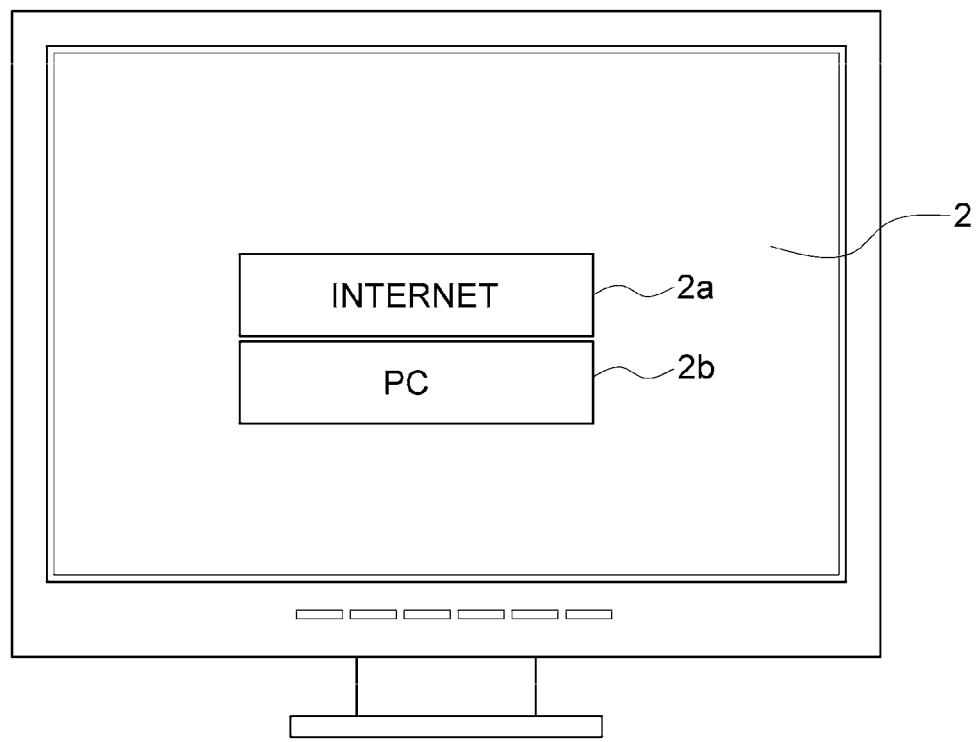
FIG. 5 shows a schematic view of an executive item icon and a group icon displayed on touch-control display device according to the first embodiment of the present invention.

FIG. 5 shows the group icon 2a and the executive item icon 2b displayed on the display panel 22 of the touch-control display device 2. The internet service accessing programs 161b are categorized into the executive item group, the group icon 2a represents the executive item group of internet service accessing programs 161b.

The executive item icon 2b representing the regular computer booting process is for executing a procedure for loading and executing the second operating system 162a.

When the executive item icon representing a regular computer booting process 2b is selected, the first embodiment of the present invention executes the regular computer booting process, as in Step 108a. Step 108b is to load and execute the second operating system 162a from the second partition 162a of the hard-disk 16 of the computer system 100 when the executive item icon representing the regular computer booting process is selected.

When the group icon 2a is selected, the computer system 100 executing the BIOS program 151 loads the executive item group to display a plurality of executive item icons representing the internet service accessing programs 161b on the display panel 22 of the touch-control display device 2, as in Step 108c.

Then, the control circuit 100a of the computer system 100 determines which among the displayed executive item icons is selected according to the input signal S1 sent by the touch-control signal receiver 21, as in Step 108d. That is, through the touch-control signal receiver 21 of the touch-control display device 2, the control circuit 100a of the computer system 100 detects whether any executive item icon on the touch-control display device 2 is selected by touching the executive item icon displayed on the touch-control display device 2. When a selection is made, the control circuit 100a of the computer system 100 determines which executive item icon is selected.

Figure 6:
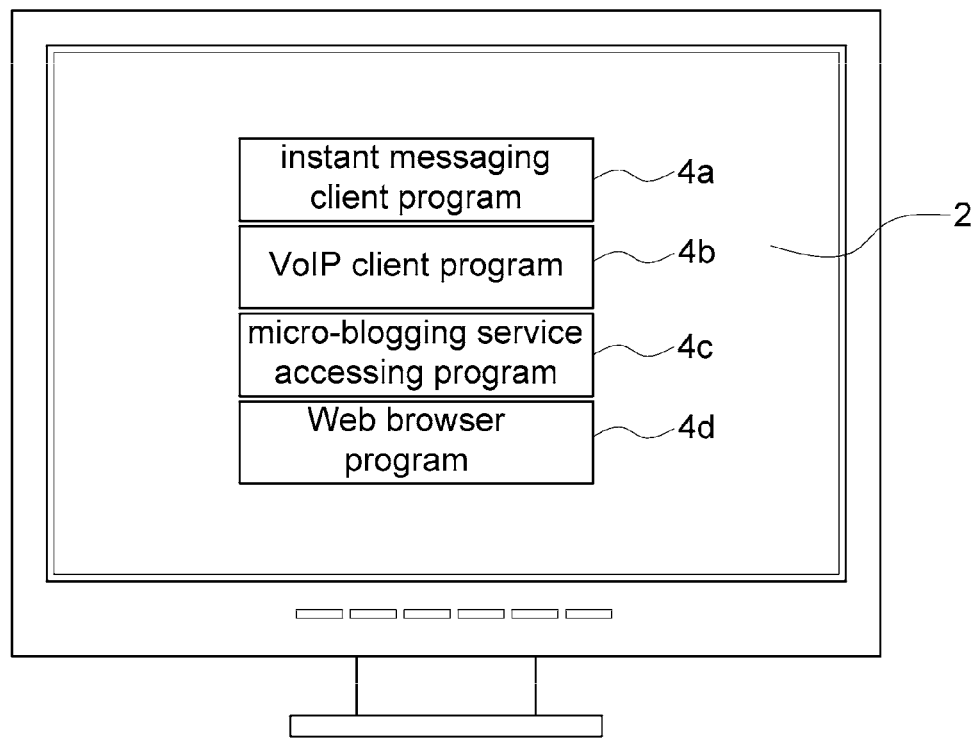
FIG. 6 shows a schematic view of a plurality of executive item icons displayed on touch-control display device according to the first embodiment of the present invention.
Figure 7:
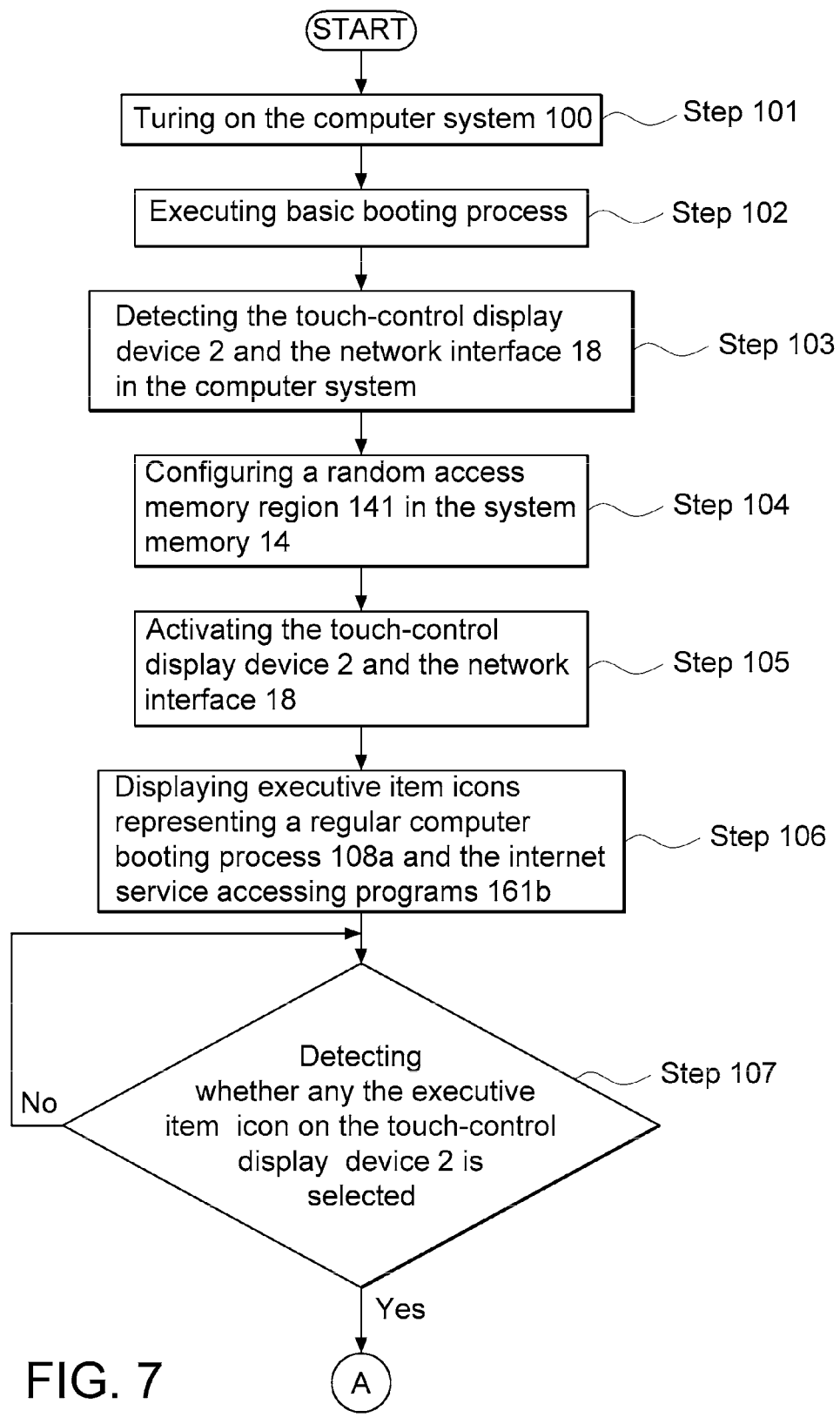
FIG. 7, FIG. 8, and FIG. 9 show a modified flowchart according to the first embodiment of the present invention.
Figure 8:
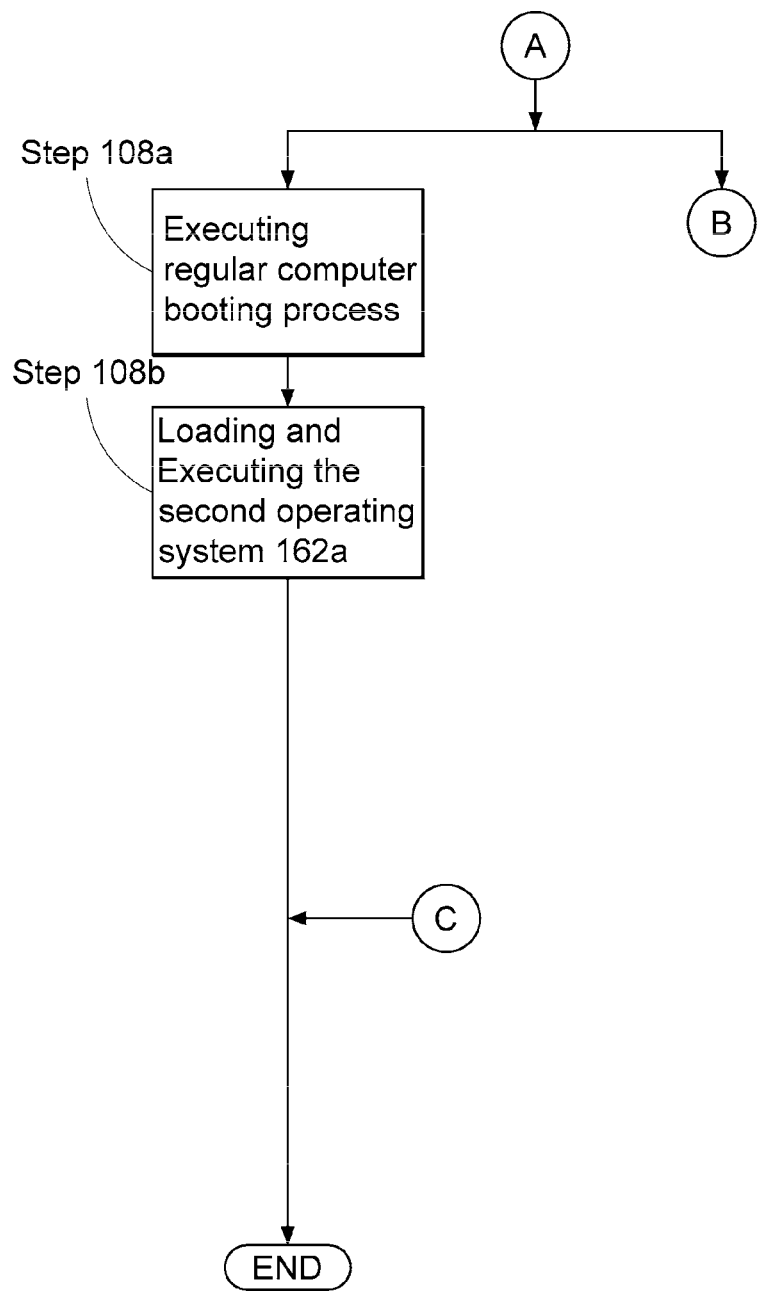
Figure 9:
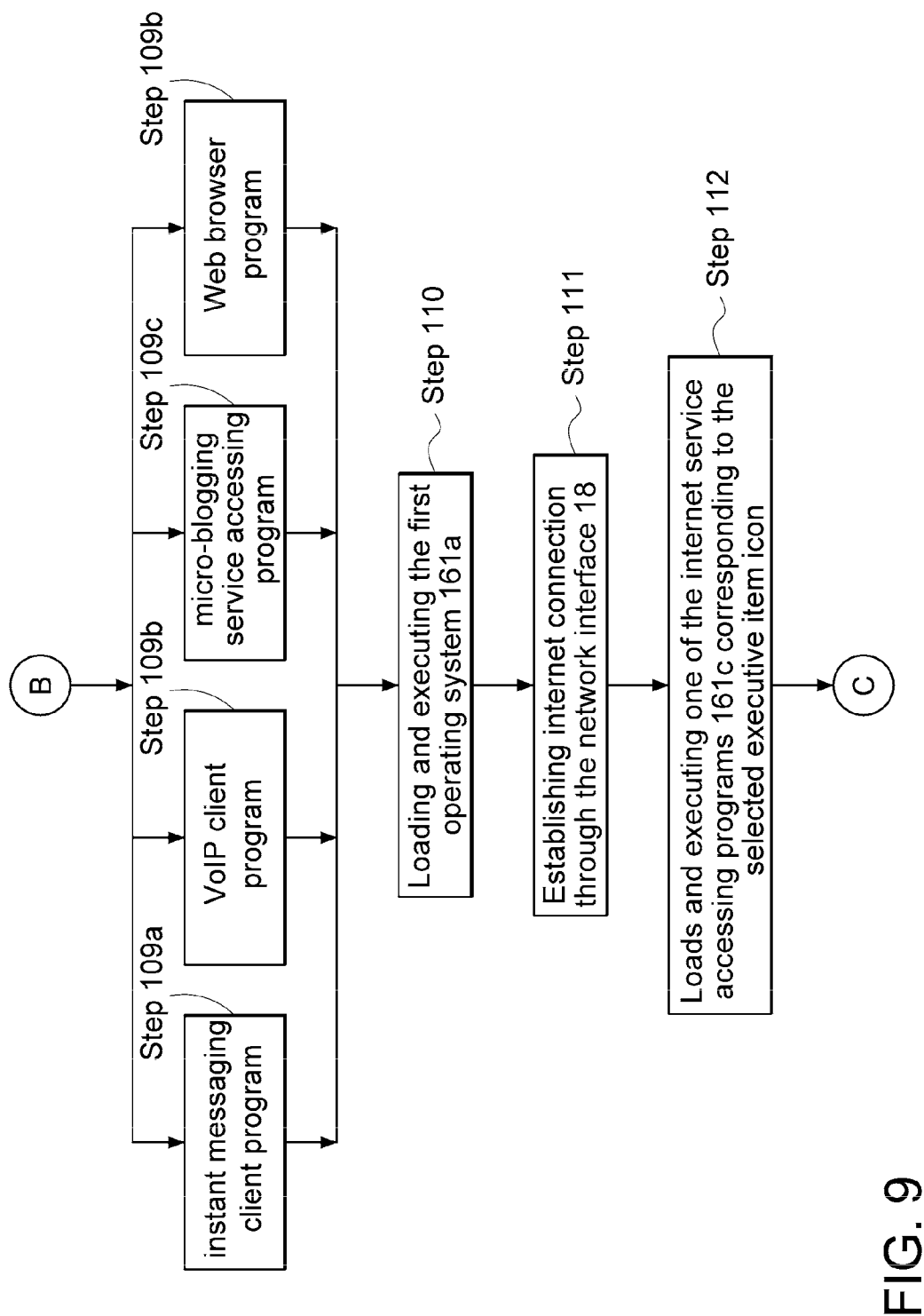
Figure 10:
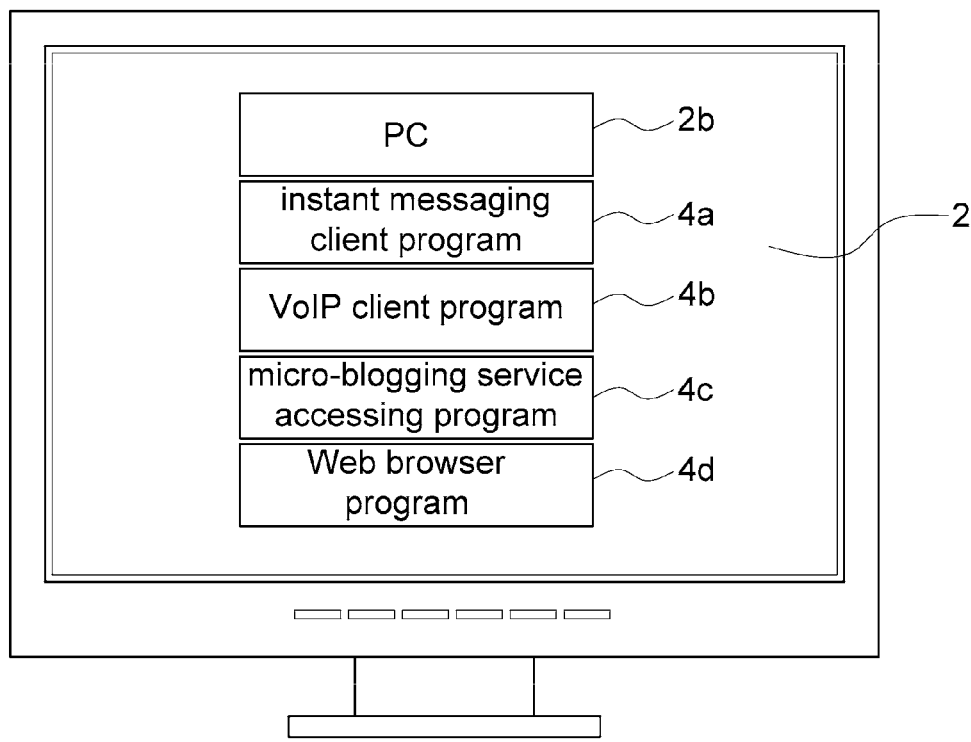
FIG. 10 shows a schematic view of a plurality of executive item icons displayed on touch-control display device according to the modified flowchart of the first embodiment.

FIG. 6 shows various executive item icons displayed on the display panel 22 of the touch-control display device 2. Each of the executive item icons represents different one among the internet service accessing programs 161b. These icons include an instant messaging client program icon 4a, i.e. MSN (trademark), a voice-over-IP (VoIP) client program icon 4b, i.e. Skype (trademark), a micro-blogging service accessing program icon 4c, i.e. Facebook (trademark), and a Web browser program icon 4d, i.e Microsoft (trademark) Internet Explorer. Each of the executive item icons representing one of the internet service accessing programs 161b is for executing a procedure for loading and executing the first operating system 161a, establishing internet connection through the network interface 18, and loading and executing the selected internet service accessing program 163.

When the selection is detected and determined, as in Step 109a, 109b, 109c, 109d, the control circuit 100a of the computer system 100 loads and executes the first operating system 161a in the first partition 161 of the hard-disk 16, as in Step 110. The first operating system 161a is a simplified operating system, which only provides basic operating environment, establishes internet connection through the network interface 18, and executes the internet service accessing programs 161c, so as to execute the procedure corresponding to the executive item icon representing the internet service accessing program.

Step 111 is the control circuit 100a of the computer system 100 to establish internet connection through the network interface 18, so as to connect the computer system 100 to an external network, i.e. the internet.

Then in Step 112, the control circuit 100a of the computer system 100 loads and executes one of the internet service accessing programs 161b corresponding to the selected executive item icon on the touch-control display device 2 from the first partition 161 the hard-disk 16. To this point, the method of the present invention allows the user to quickly activate the internet service accessing programs 161b without waiting for the tedious booting process of a regular operating system.

When the user attempts to quickly activates a specific internet service accessing program, the computer system 100 loads and executes the first operating system 161a, wherein the operating system boot process of the first operating system 161a can be quickly completed. When the user attempts to activate more applications and functions other than internet service accessing programs 161b, the control circuit 100a of the computer system 100 loads and executes the second operating system 162a, so as to load and execute the other application.

FIG. 7, FIG. 8, FIG. 9, and FIG. 10 show a modified example of the first embodiment. In this modified example, Step 108c and Step 108d are removed. Step 106 is also modified, the display panel 22 of the touch-control display device 2 displays executive item icons 2b, 4a, 4b, 4c, 4d representing internet service accessing programs 161b and the regular computer booting process. Step 107 is also modified, for the computer system 100 detecting whether any of the executive item icon 2b, 4a, 4b, 4c, 4d on the touch-control display device 2 is selected.

When the executive item icon 2b representing the regular computer booting process is selected, the control circuit 100a of the computer system 100 enters the regular computer booting process, as in Step 108a. Step 108b is to load and execute the second operating system 162a from the second partition 162 of the hard-disk 16 of the computer system 100.

When any of the executive item icons 4a, 4b, 4c, 4d of the internet service accessing programs 161b is selected, the computer system 100 loads and executes the first operating system 161a from the first partition 161 of the hard-disk 16 as in Step 110, activates the network interface 18 as in Step 111, and then loads and executes the internet service accessing program 161b corresponding to the selected executive item icon 4a, 4b, 4c, 4d as in Step 112.

Figure 11:
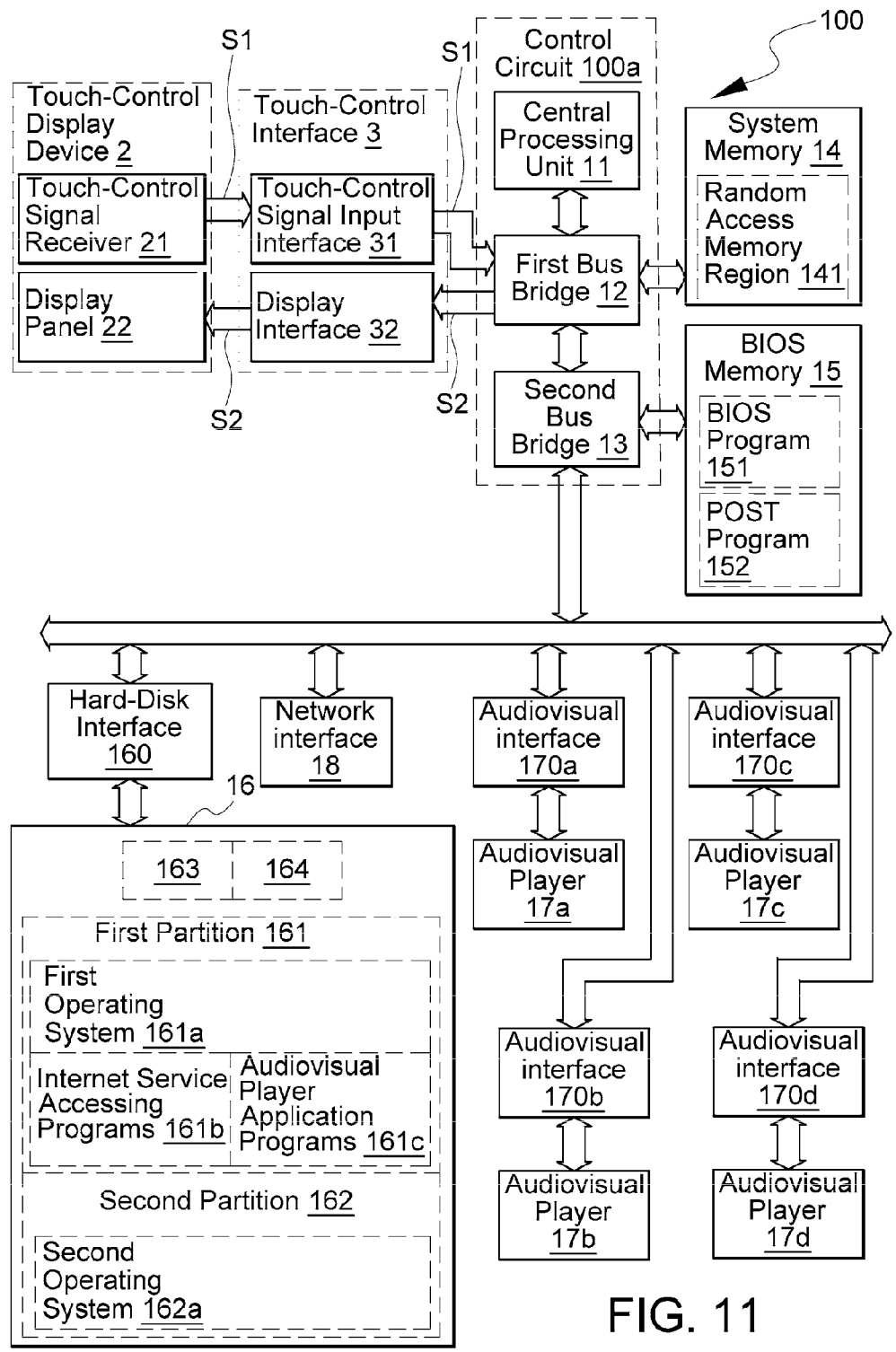
FIG. 11 shows a functional block diagram according to a second embodiment of the present invention.
Figure 12:
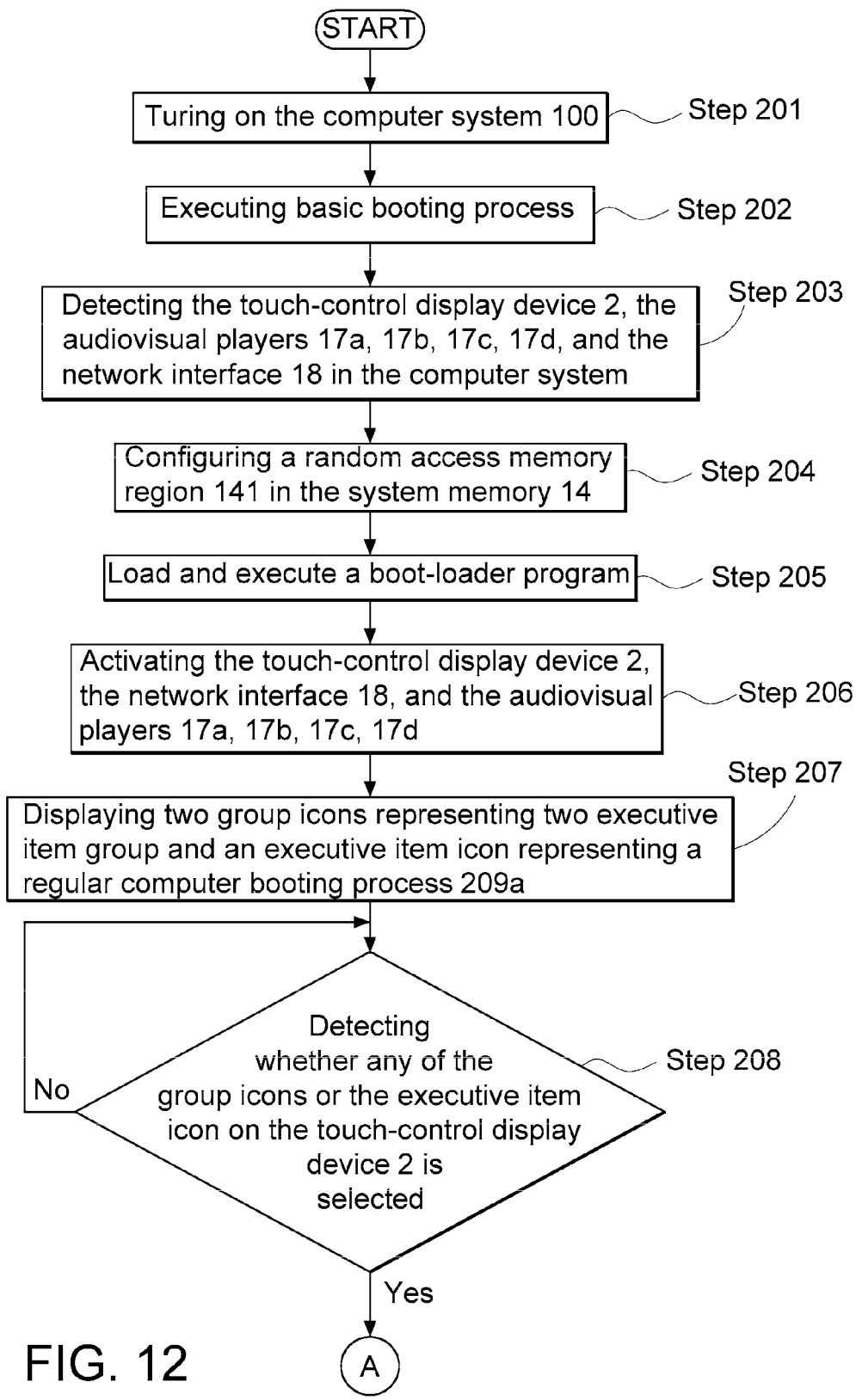
FIG. 12, FIG. 13, FIG. 14, and FIG. 15 show a flowchart according to the second embodiment of the present invention.

With reference to the drawings and in particular to FIG. 11, which shows a functional block diagram according to a second embodiment of the present invention, a computer system 100 for express execution of internet service accessing comprises a control circuit 100a and a network interface 18. The control circuit 100a includes a central processing unit 11, a first bus bridge 12, and a second bus bridge 13.

The central processing unit 11, the first bus bridge 12, the second bus bridge 13, and the network interface 18 are similar to those in the first embodiment. But, the hard-disk 16 of the second embodiment not only stores a plurality of internet service accessing programs 161b, but also stores a plurality of audiovisual player application programs 161c.

Moreover, the computer system 100 of the second embodiment further comprises a plurality of audiovisual players 17a, 17b, 17c, 17d. The second bus bridge 13 is connected the audiovisual players 17a, 17b, 17c, 17d through audiovisual interfaces 170a, 170b, 170c, 170d. The audiovisual interfaces 170a, 170b, 170c, 170d can adopt conventional standard interface to connect the audiovisual players 17a, 17b, 17c, 17d to the second bus bridge 13, so that the control circuit 100a of the computer system 100 can control the playing function of the audiovisual players 17a, 17b, 17c, 17d. The audiovisual players 17a, 17b, 17c, 17d can be a DVD, MP3, CD, or TV.

FIG. 12, FIG. 13, FIG. 14, and FIG. 15 show the flowchart of the second embodiment of the present invention. The following description refers to FIG. 11, FIG. 12, FIG. 13, FIG. 14, and FIG. 15.

Step 201 is to turn on the computer system 100. In Step 202, the computer system 100 executes basic booting process.

Before loading and executing the first operating system 161a or the second operating system 162a, the computer system 100 executing the BIOS program 151 performs the following steps.

Step 203 is for the computer system 100 executing the BIOS program 151 to detect the touch-control display device 2, the audiovisual players 17a, 17b, 17c, 17d, and network interface 18 in the computer system 100. As aforementioned description, the audiovisual players 17a, 17b, 17c, 17d can be DVD player, MP3 player, CD player, TV, and so on.

In Step 204, the computer system 100 configures a random access memory region 141 in the system memory 14 of the computer system 100 for the space required for executing the first or the second operating system 161a, 162a, the touch-control display driver 164, the network interface driver 163, the internet service accessing programs 161b, the audiovisual player driver, and the audiovisual player application programs 161c.

Step 205 is for the computer system 100 executing the BIOS program 151 to load and execute a boot-loader program stored in the main boot record (MBR) sector of the hard-disk 16.

In Step 206, by executing the boot-loader program, the computer system 100 loads and executes the touch-control display driver 164 from the hard-disk 16 to activate the touch-control display device 2, so that the touch-control display device 2 can start to operate. In Step 206, the computer system 100 also loads and executes the network interface driver and the drivers of the audiovisual players 17a, 17b, 17c, 17d from the hard-disk 16, so as to activate the network interface 18 and the audiovisual players 17a, 17b, 17c, 17d.

In Step 207, the display panel 22 of the touch-control display device 2 displays a plurality of group icons 2a, 2c representing two executive item groups and an executive item icon 2b representing a regular computer booting process.

In Step 208, the computer system 100 detects whether any of the group icons 2a, 2c or the executive item icon 2b on the touch-control display device 2 is selected through the touch-control display device 2. When a selection is detected, the computer system 100 determines which among the group icons 2a, 2c and the executive item icon 2b representing a regular computer booting process is selected.

Figure 16:
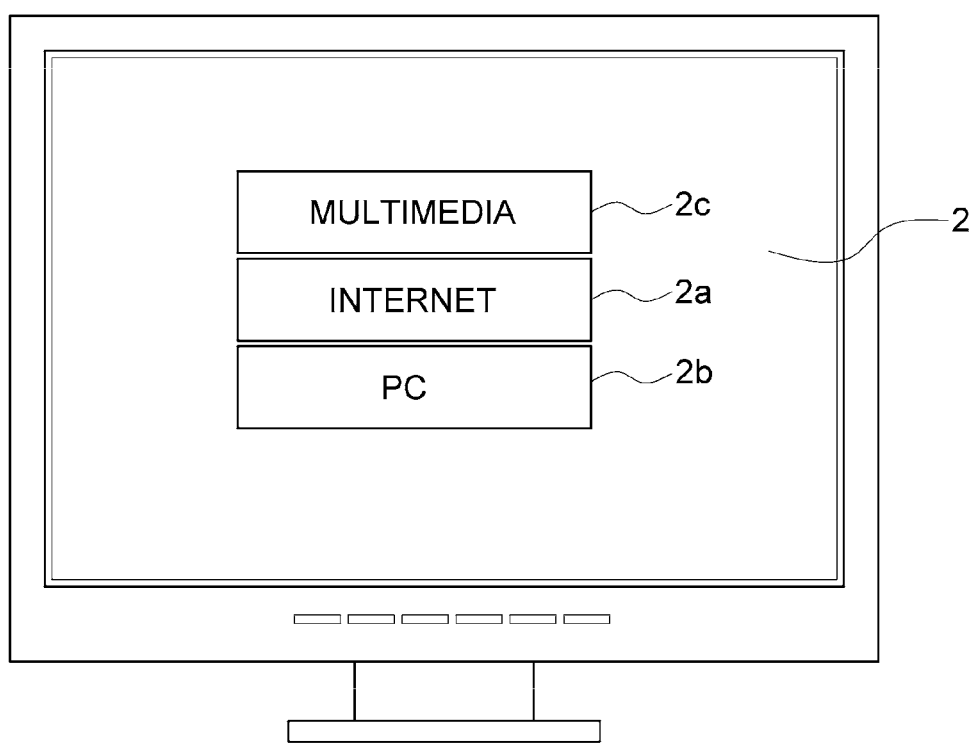
FIG. 16 shows a schematic view of an executive item icon and two group icon displayed on touch-control display device according to the second embodiment of the present invention.

FIG. 16 shows the group icons and the executive item icon displayed on the display panel 22 of the touch-control display device 2. The internet service accessing programs 161b and the audiovisual player application programs 161c are categorized into two executive item groups, and the two group icons 2a, 2c respectively represent the executive item groups of internet service accessing programs 161b and the audiovisual player application programs 161c. The executive item icon 2b representing the regular computer booting process is for executing a procedure for loading and executing the second operating system 162a.

When the executive item icon representing the regular computer booting process 209a is selected, the second embodiment of the present invention enters the regular computer booting process, as in Step 209a. Step 209b is to load and execute the second operating system 162a from the second partition 162 of the hard-disk 16 of the computer system 100 when the executive item icon 2b representing the regular computer booting process is selected.

Figure 13:
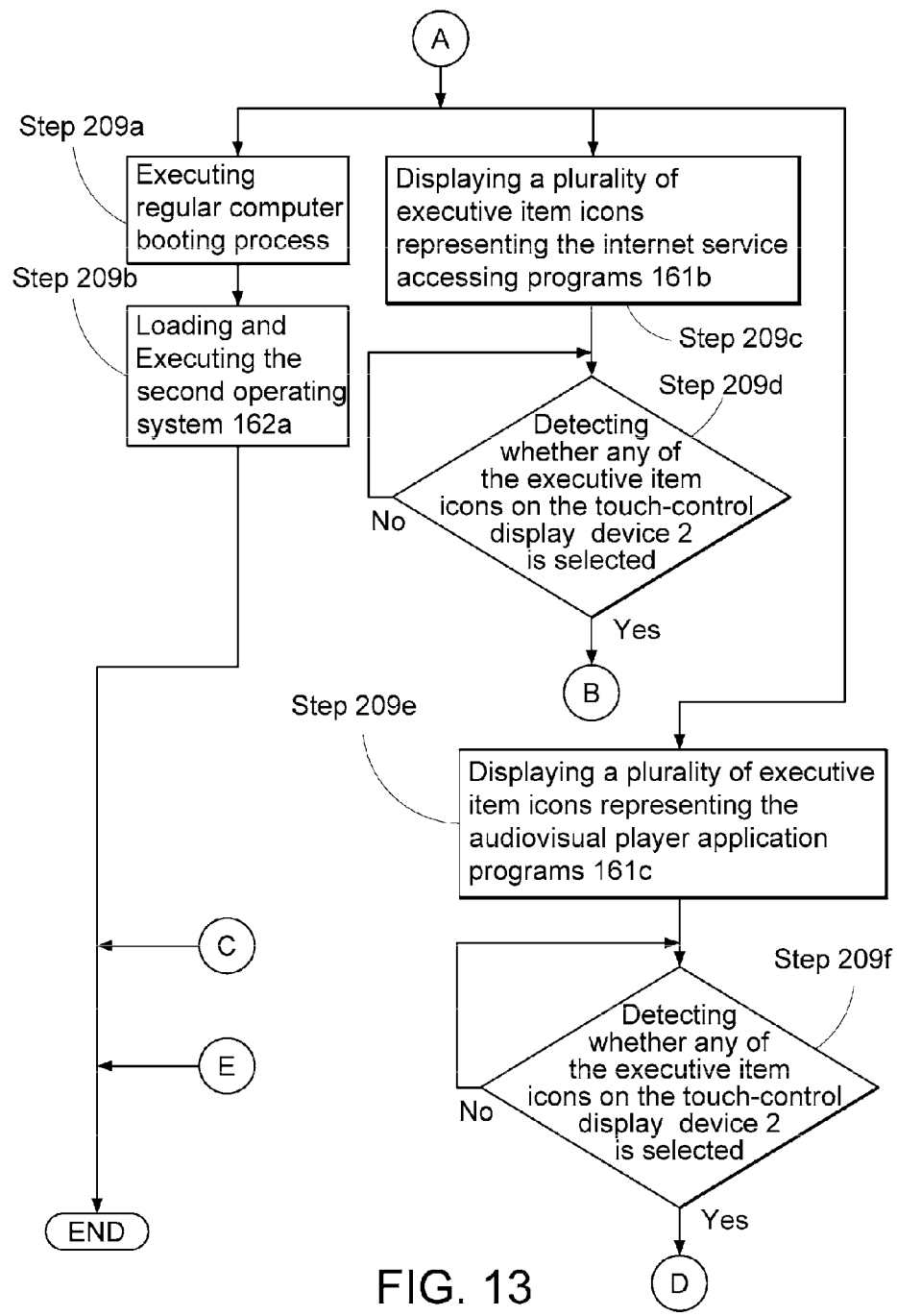
Figure 14:
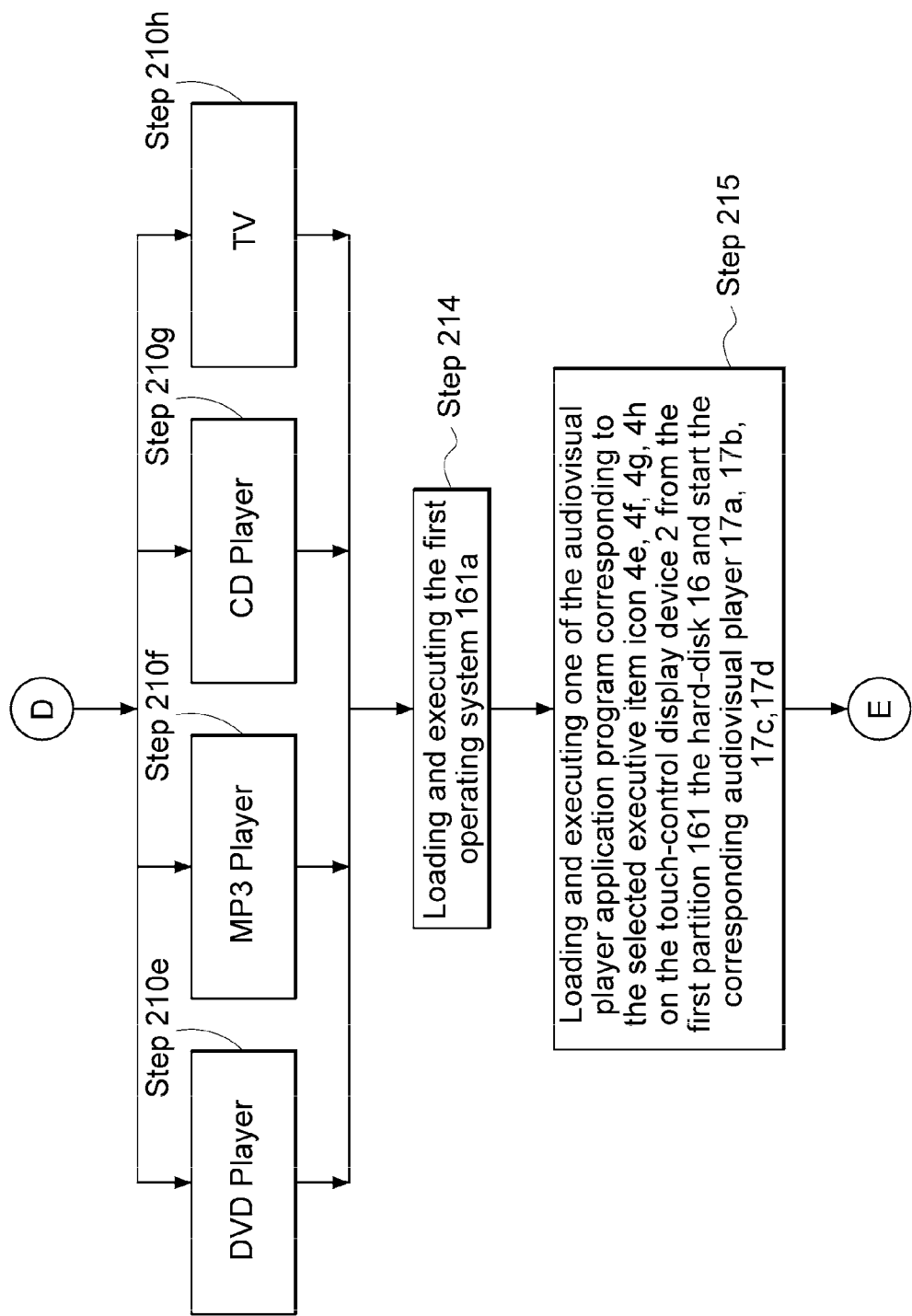

Please refer to FIG. 13 and FIG. 14, when the group icon 2c representing the audiovisual player application programs 161c is selected, the computer system 100 executing the BIOS program 151 displays a plurality of executive item icons 4e, 4f, 4g, 4h representing the audiovisual player application programs 161c by the display panel 22 of the touch-control display device 2, as in Step 209e.

Figure 17:
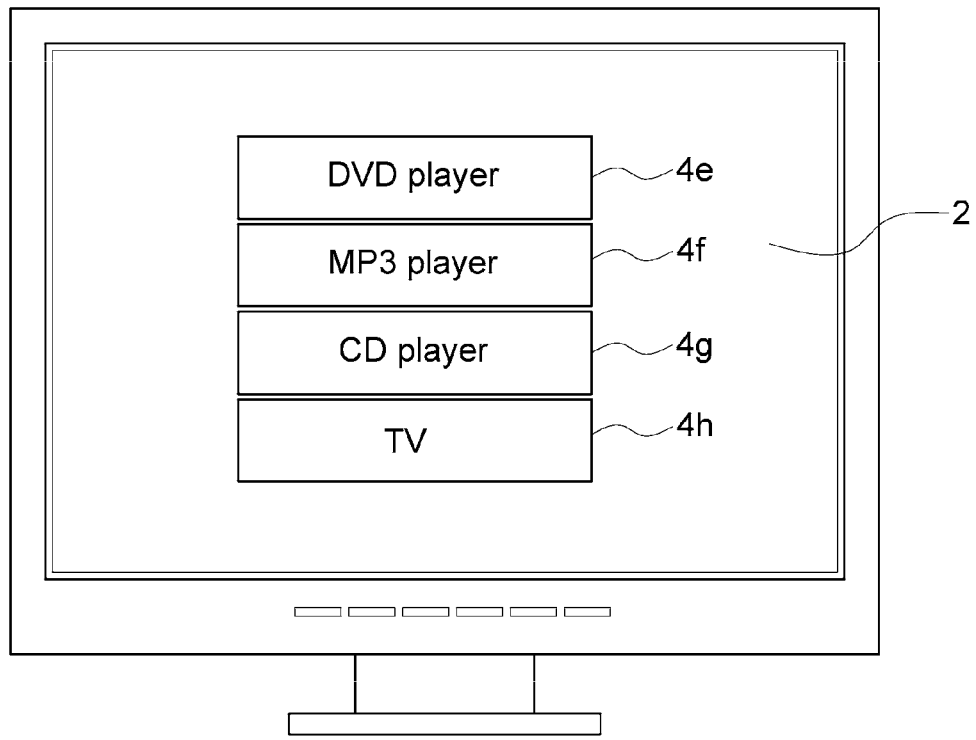
FIG. 17 and FIG. 18 show schematic views of a plurality of executive item icons displayed on touch-control display device according to the second embodiment of the present invention.

FIG. 17 shows various executive item icons displayed on the display panel 22 of the touch-control display device 2. Each of the executive item icons represents different one among the audiovisual player application programs 161c. These icons include a DVD player icon 4e, a MP3 player icon 4f, a CD player icon 4g, and a TV icon 4h. Each of the executive item icons 4e, 4f, 4g, 4h representing one of the audiovisual player application programs 161c is for executing a procedure for loading and executing the first operating system 161a, activating a corresponding audiovisual player 17a, 17b, 17c, 17d, loading and executing the corresponding audiovisual player application programs 161c, and activating and playing the audiovisual player 17a, 17b, 17c, 17d.

Please refer to FIG. 14, when the user touches the touch-control display device 2 to select one of the DVD player icon 4e, the MP3 player icon 4f, the CD player icon 4g, and the TV icon 4h, the control circuit 100a of the computer system 100 determines the selection, as in as in Step 210e, 210f, 210g, 210h, the control circuit 100a of the computer system 100 loads and executes the first operating system 161a in the first partition 161 of the hard-disk 16, as in Step 214.

Then, the control circuit 100a of the computer system 100 loads and executes one of the audiovisual player application program corresponding to the selected executive item icon 4e, 4f, 4g, 4h on the touch-control display device 2 from the first partition 161 the hard-disk 16 and start the corresponding audiovisual player, as in Step 215.

After the first operating system 161a is loaded and executed, the computer system 100 loads and executes the audiovisual player application program 162b and plays the audiovisual player corresponding to the selected icon on the touch-control display device 2 from the hard-disk 16. To this point, the method of the present invention allows the user to quickly activate the audiovisual player application programs 161c without waiting for the tedious booting process of a regular operating system, as in Step 209a.

Similarly, when the group icon 2a representing the internet service accessing programs 161b is selected, the computer system 100 loads the executive item group to display a plurality of executive item icons representing the internet service accessing programs 161*b* on the display panel 22 of the touch-control display device 2, as in Step 209*c*. Then the control circuit 100*a* of the computer system 100 determines which among the displayed executive item icons is selected through the touch-control display device 2, as in Step 209*d*.

Figure 15:
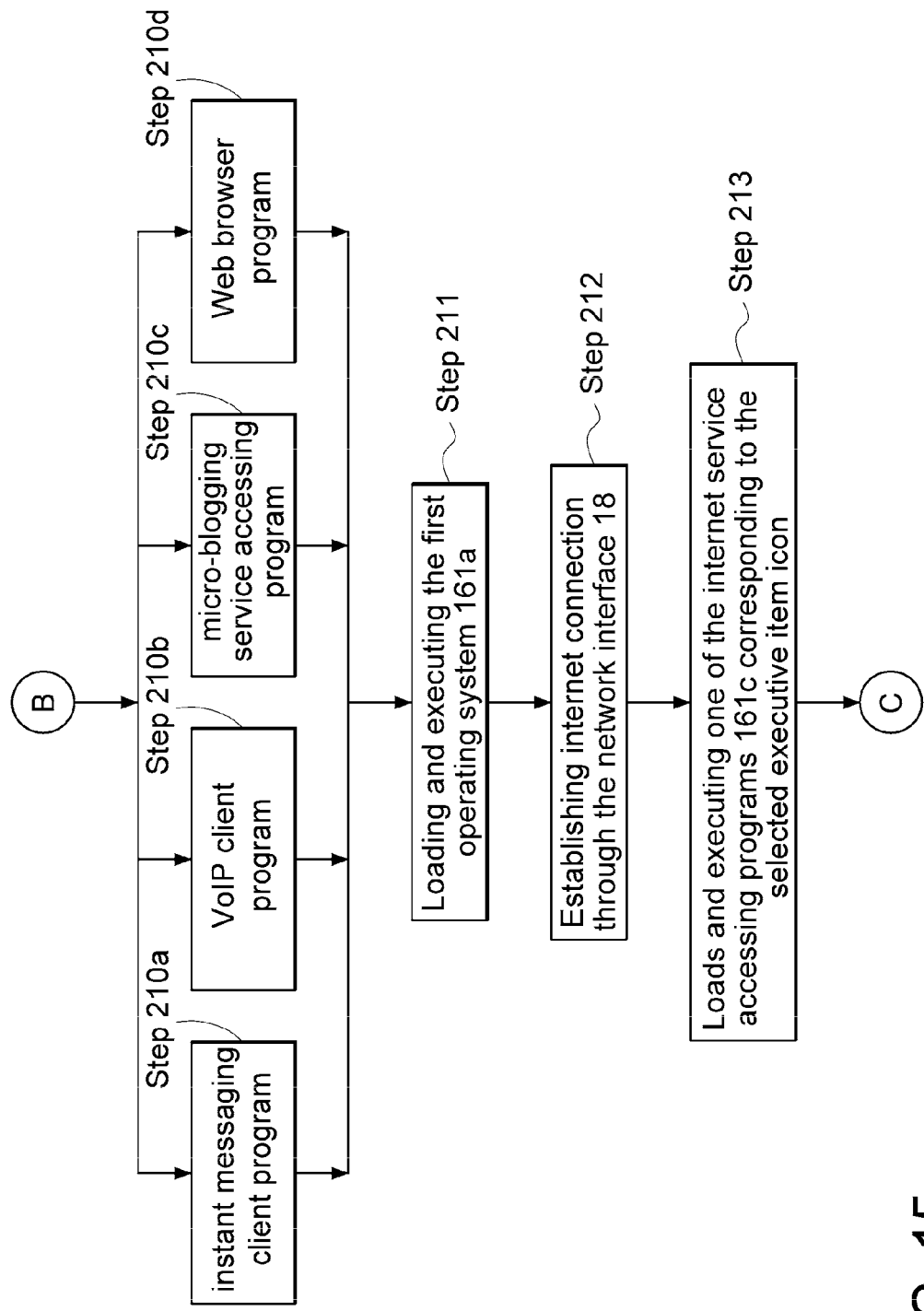
Figure 18:
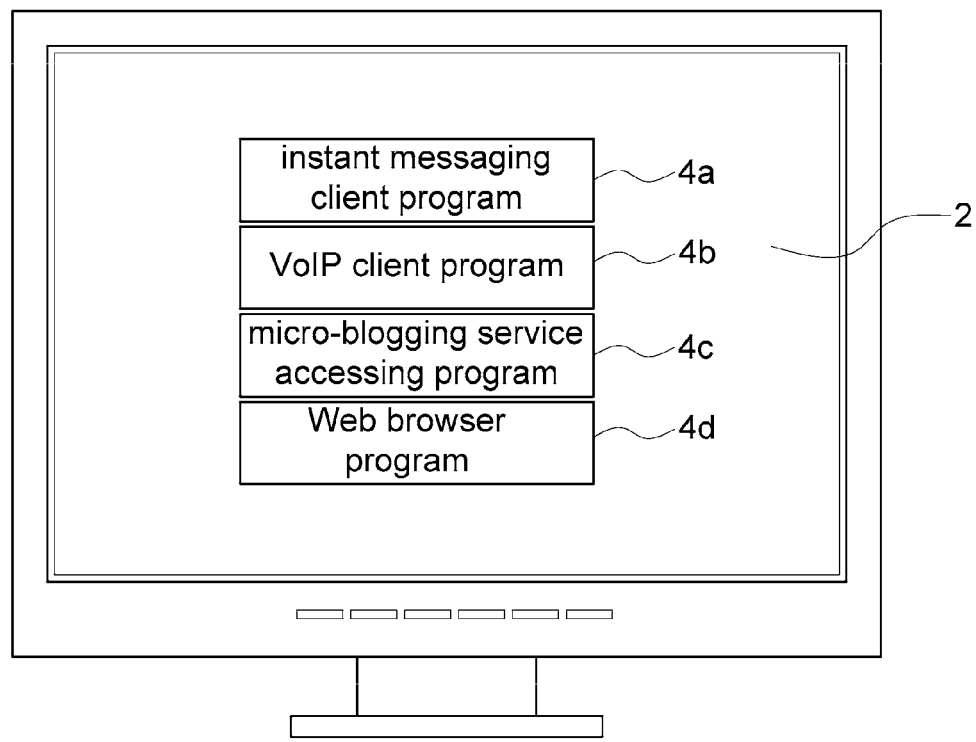
Figure 19:
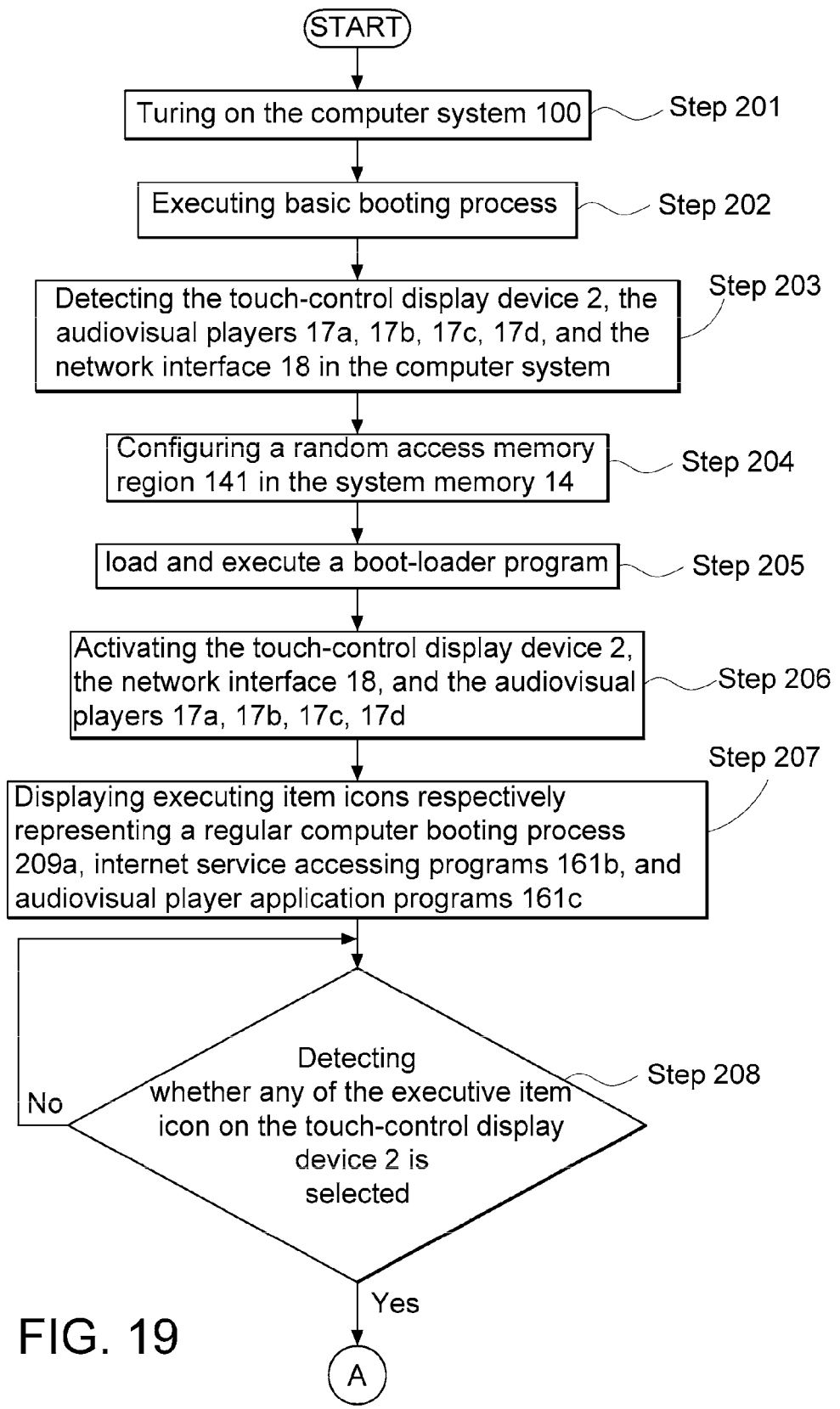
FIG. 19, FIG. 20, FIG. 21, and FIG. 22 show a modified flowchart according to the second embodiment of the present invention.
Figure 20:
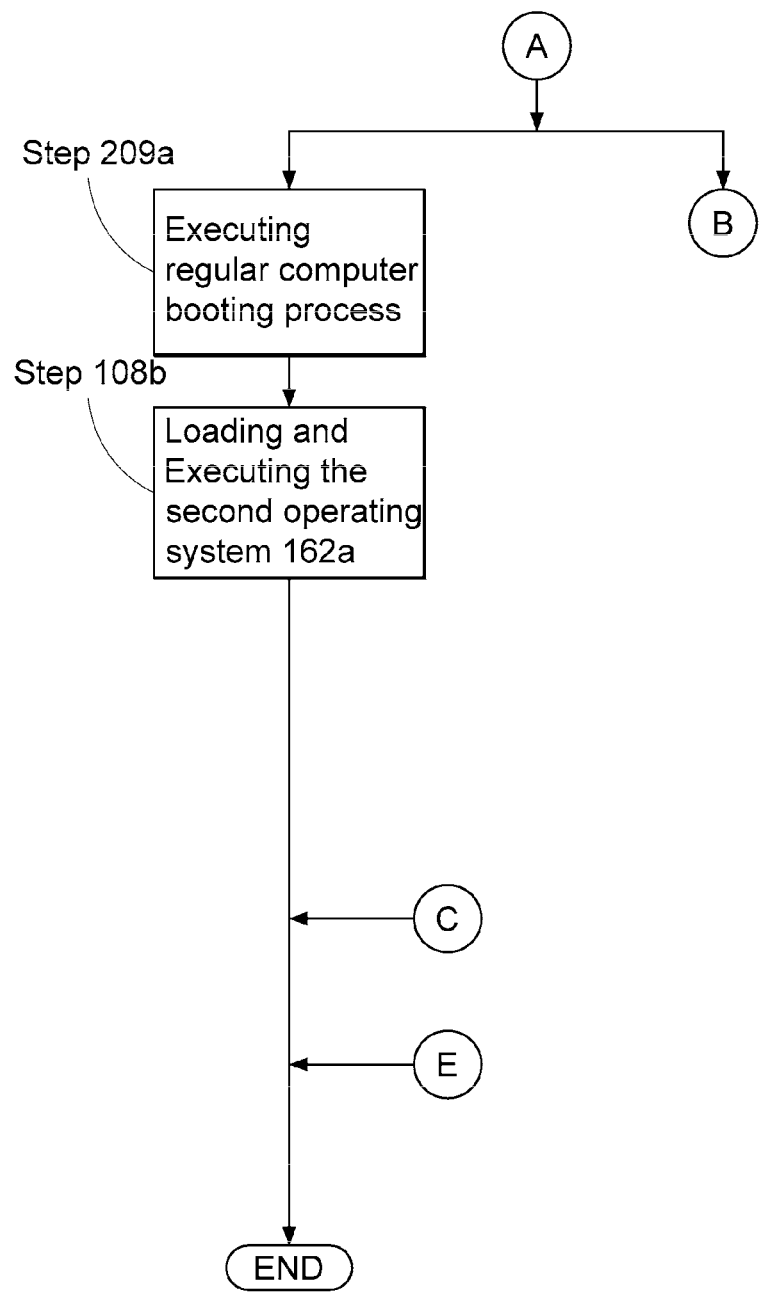
Figure 21:
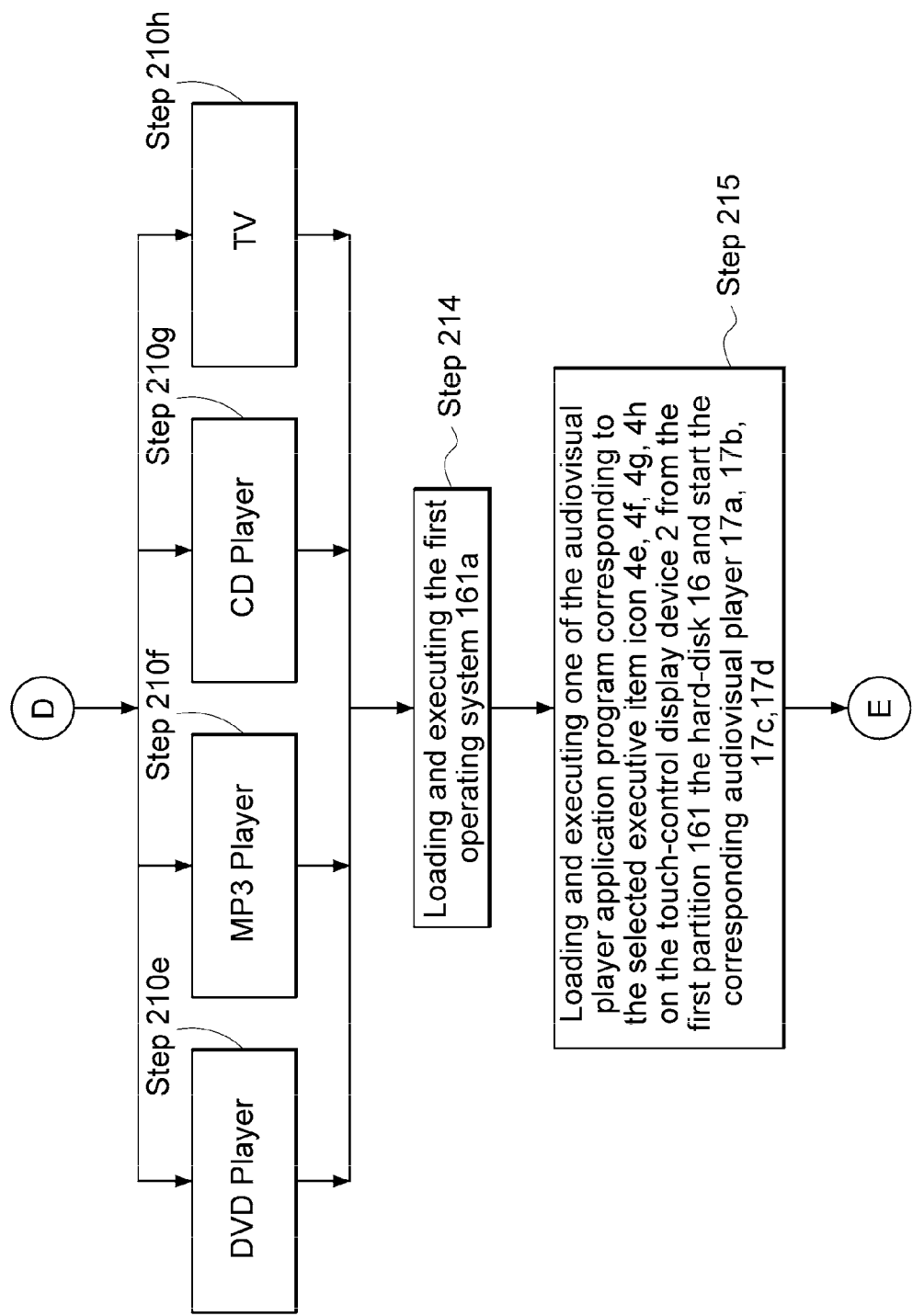
Figure 22:
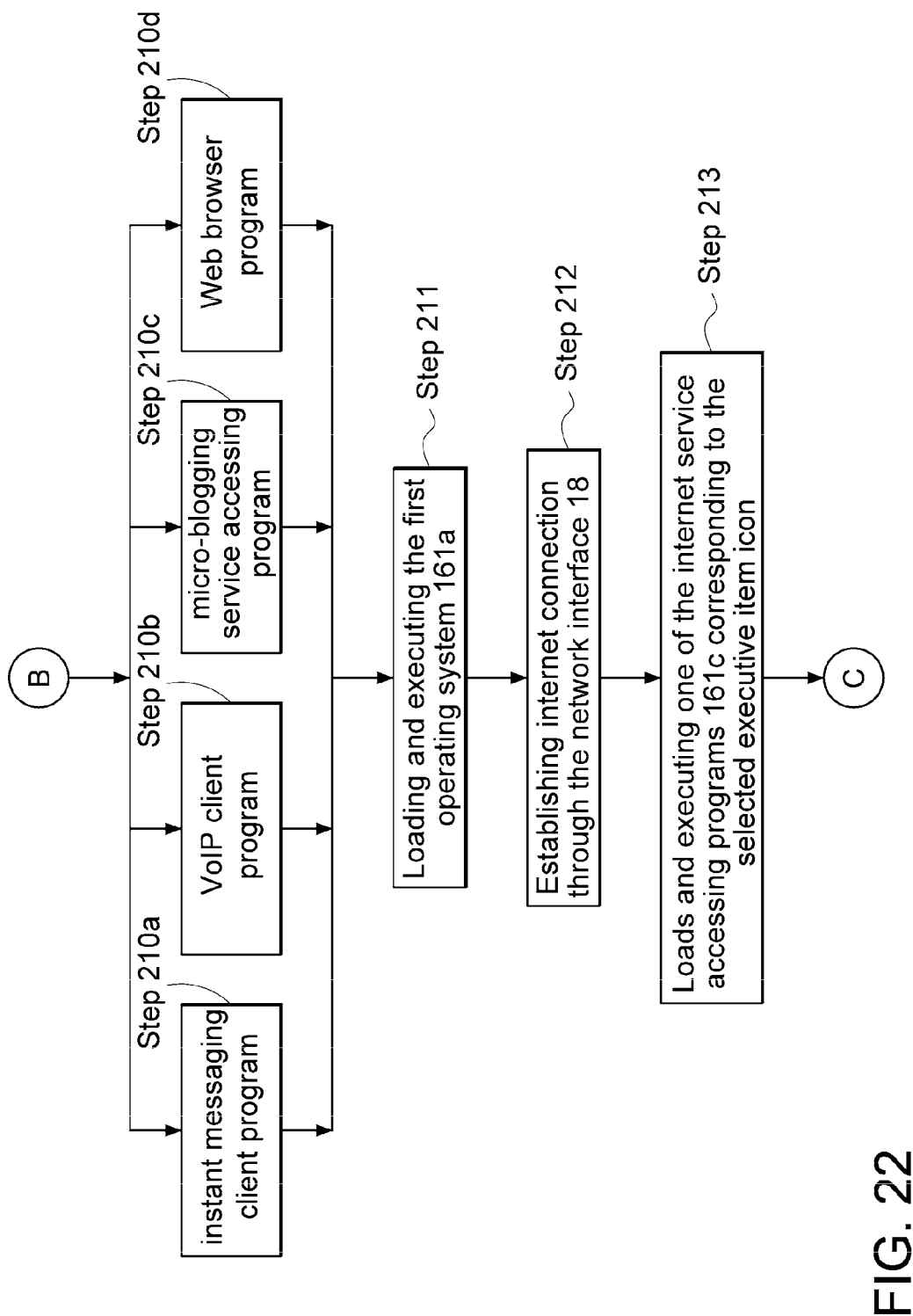
Figure 23:
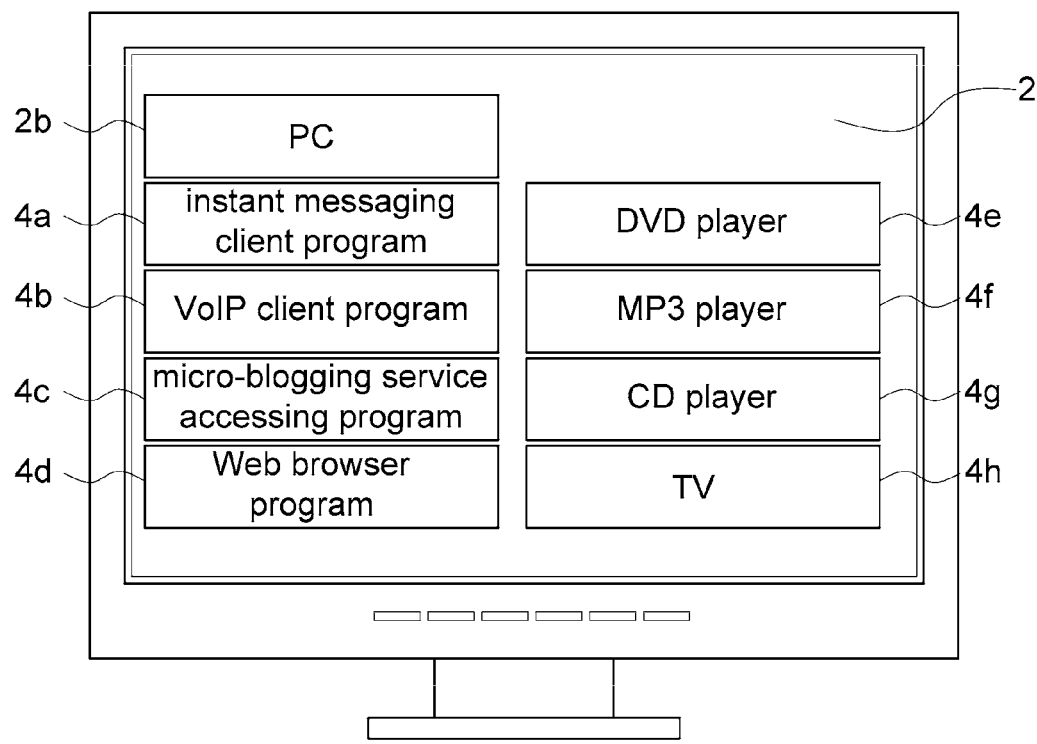
FIG. 23 shows a schematic view of a plurality of executive item icons displayed on touch-control display device according to the modified flowchart of the second embodiment.

Refer to FIG. 13, FIG. 15, and FIG. 18, the steps after the executive item icon 4*a*, 4*b*, 4*c*, 4*d* representing one of the internet service accessing programs 161*b* is selected are the same as the steps for loading and executing any one of the internet service accessing programs 161*b* in the first embodiment. The steps includes:

When the selection is detected and determined, as in Step 210*a*, 210*b*, 210*c*, 210*d*, the control circuit 100*a* of the computer system 100 loads and executes the first operating system 161*a* in the first partition 161 of the hard-disk 16, as in Step 211.

And then the computer system 100 establishes the internet connection through the network interface 18, and then loads and executes the selected internet service accessing program 161*b*, as in Steps 212, 213.

FIGS. 19 to 23 show a modified example of the second embodiment. In this modified example, the Steps 209*c*, 209*d*, 209*e*, 209*f* are omitted. Step 207 is modified; therefore the touch-control display device 2 displays all the executive item icons 2*b*, 4*a*, 4*b*, 4*c*, 4*d*, 4*e*, 4*f*, 4*g*, 4*h* simultaneously. Step 208 is also modified, for the computer system 100 detecting whether any of the executive item icons 2*b*, 4*a*, 4*b*, 4*c*, 4*d*, 4*e*, 4*f*, 4*g*, 4*h* displayed on the touch-control display device 2 is selected.

One difference between the first embodiment and the second embodiment is that the computer system 100 in the second embodiment further comprises a boot-loader program stored in the MBR of the hard-disk 16. If the storage capacity of the BIOS memory 15 is large enough, the boot-loader program can be integrated into the BIOS program 151. At this time, the step for loading and executing the boot-loader program can be omitted, such as that disclosed in the first embodiment, and the BIOS program 151 is utilized to activate the touch-control display device 2, detect the selection of the executive item, load and execute the operating system, and load and execute the other application program.

The aforementioned embodiments show that the present invention provides a method for express execution of internet service accessing with a user-friendly interface which is easy to operate. The present invention also shortens the waiting period of a regular computer booting process in conventional multimedia computer system.

While the invention has been described in connection with what is presently considered to the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. A method for express execution of internet service accessing with a touch-control interface for a computer system, comprising the following steps of:
   (a) turning on the computer system;
      wherein the computer system is arranged such that the computer system includes at least one data storage, a system memory, a BIOS, a touch-control display device, and a network interface; and the data storage stores a first operating system, a touch-control display device driver for activating the touch-control display device, a network interface driver for activating the network interface, and at least one internet service accessing program;
   (b) executing the BIOS of the computer system;
   (c) before loading and executing the first operating system, performing the steps of:
      (c1) detecting the touch-control display device and the network interface;
      (c2) loading and executing the touch-control display driver to activate the touch-control display device;
      (c3) displaying an executive item icon representing the internet service accessing program with the touch-control display device;
         wherein the executive item icon representing the internet service accessing program is for executing a procedure for loading and executing the first operating system, establishing internet connection through the network interface, and loading and executing the internet service accessing program;
      (c4) detecting whether a selection is made by touching the executive item icon displayed on the touch-control display device; and
      (c5) executing the procedure corresponding to the executive item icon when the executive item icon representing the internet service accessing program is touched on the touch-control display device.

2. The method as claimed in claim 1, wherein the computer system comprises a plurality of data storage, and the data storage storing the first operating system is different from the data storage storing the touch-control display device driver, the network interface driver, and the internet service accessing program.

3. The method as claimed in claim 1, wherein the computer system comprises a plurality of data storage; one or more of the drivers including the touch-control display device driver, the network interface driver, and the internet service accessing program are stored in the data storage which also stores the first operating system, and the others are stored different from the data storage storing the first operating system.

4. The method as claimed in claim 1, wherein the icon representing the internet service accessing program is selected from the group consisting of an instant messaging client program icon, a voice-over-IP client program icon, a micro-blogging service accessing program icon, and a Web browser program icon.

5. The method as claimed in claim 4, wherein the step (c1) further comprises a step of detecting the audiovisual player.

6. The method as claimed in claim 1, wherein:
   the computer system further comprises at least one audiovisual player, and the data storage stores at least one audiovisual player application program corresponding to the audiovisual player; and
   the step (c3) further comprising displaying an executive item icon representing the audiovisual player application program in which the executive item icon representing the audiovisual player application program is for executing a procedure for loading and executing the first operating system, executing the audiovisual player application program, and activate and play the audiovisual player.

7. The method as claimed in claim 1, further comprising a step between the step (c1) and step (c2) of loading and executing a boot-loader program stored in the main boot record sector of the data storage.

8. A method for express execution of internet service accessing for a computer system, comprising the following steps of:

(a) turning on the computer system, wherein the computer system is arranged such that the computer system at least includes at least one data storage, a system memory, a BIOS, a touch-control display device, and a network interface; and the data storage stores a first operating system, a second operating system, an at least one internet service accessing program;

(b) executing the BIOS of the computer system; and (c) before loading and executing the first operating system or the second operating system, performing the steps of:

(c1) displaying a plurality of executive item icons representing a regular computer booting process and at least one internet service accessing program with the touch-control display device;

wherein the executive item icon representing the regular computer booting process is for executing a procedure for loading and executing the second operating system; and wherein the executive item icon representing the internet service accessing program is for executing a procedure for loading and executing the first operating system, establishing internet connection through the network interface, and loading and executing the internet service accessing program;

(c2) determining which among the displayed executive item icons is selected by the touch-control display device; and (c3) executing the procedure corresponding to the selected executive item icon.

9. The method as claimed in claim 8, wherein in step (c1), the item icon representing the internet service accessing program is categorized into an executive item group, and the step (c1) further comprises the steps of:

displaying the group icon representing the executive item group of the internet service accessing program and the executive item icon representing the regular computer booting process with the touch-control display device;

determining which among the displayed executive item icon and the group icon is selected by the touch-control display device; and executing the procedure corresponding to the selected executive item icon when the executive item icon representing the regular computer booting process is selected, or displaying the executive item icon of the internet service accessing program when the group icon of the internet service accessing program is selected.

10. The method as claimed in claim 8, wherein the computer system comprises a plurality of dada storages, and the first operating system and the second operating are stored in different data storages respectively.

11. The method as claimed in claim 8, wherein the icon representing the internet service accessing program is selected from the group consisting of an instant messaging client program icon, a voice-over-IP client program icon, a micro-blogging service accessing program icon, and a Web browser program icon.

12. The method as claimed in claim 8, wherein:

the computer system further comprises at least one audiovisual player, and the data storage stores at least one audiovisual player application program corresponding to the audiovisual player; and the step (c1) further displaying an executive item icon representing the audiovisual player application program for executing a procedure for loading and executing the first operating system, executing the audiovisual player application program, and activate and play the audiovisual player.

13. The method as claimed in claim 12, wherein in step (c1), the item icons representing the internet service accessing program and the audiovisual player application program are categorized into two executive item groups, and the step (c1) further comprises the steps of:

displaying the group icons representing the executive item group of the internet service accessing program, the group icons representing the executive item group of the audiovisual player application program, and the executive item icon representing the regular computer booting process with the touch-control display device;

determining which among the displayed executive item icon and the group icons is selected by the touch-control display device; and executing the procedure corresponding to the selected executive item icon when the executive item icon representing the regular computer booting process is selected; displaying the executive item icon of the internet service accessing program when the group icon of the internet service accessing program is elected; or displaying the executive item icon of the audiovisual player application program when the group icon of audiovisual player application program is selected.

14. A computer system for express execution of internet service accessing, comprising:

a control circuit;

a BIOS memory, connected to the control circuit and storing a BIOS program;

a system memory, connected to the control circuit;

a touch-control display device, connected to the control circuit, for sending an input signal to the control circuit and receiving visual signals generated by the control circuit for displaying;

a network interface, connected to the control circuit for establishing internet connection; and at least one data storage, storing a first operating system, a touch-control display device driver for activating the touch-control display device, a network interface driver for activating the network interface, and at least one internet service accessing program;

wherein the computer system is arranged such that after the computer system is turned on, the control circuit executes the BIOS program to detect the touch-control display device and the network interface, and loads and executes the touch-control display driver to activate the touch-control display device;

the touch-control display device displays at least one executive item icon representing at least one internet service accessing program before loading and executing the first operating system;

the control circuit determines which among the displayed executive item icons is selected according to the input signal sent by the touch-control display device before loading and executing the first operating system; and after any of the displayed executive item icons is selected, the control circuit loads and executes the first operating system, establishes internet connection through the network interface, and loads and executes the internet service accessing program corresponding the selected executive item icon.

15. The computer system as claimed in claim 14, wherein the touch-control display device includes:

an touch-control signal receiver, disposed on the display panel, and connected to the control circuit, for sending the input signal to the control circuit; and a display panel, for receiving the visual signals generated by the control circuit for displaying.

16. The computer system as claimed in claim 14, wherein the computer system comprises a plurality of data storage, and the data storage storing the first operating system is different from the data storage storing the touch-control display device driver, the network interface driver, and the internet service accessing program.

17. The computer system as claimed in claim 14, wherein the computer system comprises a plurality of data storage; one or more of the drivers including the touch-control display device driver, the network interface driver, and the internet service accessing program are stored in the data storage which also stores the first operating system, and the others are stored different from the data storage storing the first operating system.

18. The computer system as claimed in claim 14 wherein:
the data storage further stores a second operating system;
the touch-control display device further displays an executive item icon representing a regular computer booting process of the second operating system; and
the control circuit loads and executes the second operating system when the executive item icon representing the regular computer booting process is selected.

19. The computer system as claimed in claim 18, wherein the computer system comprises a plurality of data storage, and the data storage storing the first operating system is different from the data storage storing the second operating system.

20. The computer system as claimed in claim 18, wherein the first operating system and the second operating system are stored in a first partition and a second partition respectively.

21. The computer system as claimed in claim 14, wherein the icon representing the internet service accessing program is selected from the group consisting of an instant messaging client program icon, a voice-over-IP client program icon, a micro-blogging service accessing program icon, and a Web browser program icon.

22. The computer system as claimed in claim 14, further comprising:
at least an audiovisual player, connected to the circuit; and
at least one audiovisual player application program, stored in the data storage;
wherein the touch-control display device further displays an executive item icon representing the audiovisual player application program, and the control circuit loads and executes the first operating system, activates the audiovisual player, and loads and executes the audiovisual player application program when the executive item icon representing the audiovisual player application program is selected.

* * * * *